(12) United States Patent
Hatanaka et al.

(10) Patent No.: US 9,836,891 B2
(45) Date of Patent: Dec. 5, 2017

(54) SHAPE DATA GENERATION METHOD AND APPARATUS

(71) Applicants: FUJITSU LIMITED, Kawasaki-shi, Kanagawa (JP); The University of Tokyo, Tokyo (JP)

(72) Inventors: Kohei Hatanaka, Fujisawa (JP); Toshiaki Hisada, Tokyo (JP); Seiryo Sugiura, Tokyo (JP); Takumi Washio, Tokyo (JP); Jun-ichi Okada, Tokyo (JP)

(73) Assignees: FUJITSU LIMITED, Kawasaki (JP); The University of Tokyo, Tokyo (JP)

(*) Notice: Subject to any disclaimer, the term of this patent is extended or adjusted under 35 U.S.C. 154(b) by 115 days.

(21) Appl. No.: 14/602,829

(22) Filed: Jan. 22, 2015

(65) Prior Publication Data
US 2015/0130804 A1 May 14, 2015

Related U.S. Application Data

(63) Continuation of application No. PCT/JP2012/068636, filed on Jul. 23, 2012.

(51) Int. Cl.
*G06T 19/20* (2011.01)
*G06T 17/20* (2006.01)

(52) U.S. Cl.
CPC .......... *G06T 19/20* (2013.01); *G06T 17/20* (2013.01); *G06T 2210/41* (2013.01);
(Continued)

(58) Field of Classification Search
None
See application file for complete search history.

(56) References Cited

U.S. PATENT DOCUMENTS 6,104,775 A * 8/2000 Tuy .................. G06T 11/005
378/15
2002/0184470 A1 12/2002 Weese et al.
(Continued)

FOREIGN PATENT DOCUMENTS

JP 2002-329216 A 11/2002
JP 2004-265337 A 9/2004
(Continued)

OTHER PUBLICATIONS

Extended European Search Report dated Dec. 18, 2015 in Patent Application No. 12881634.5.
(Continued)

*Primary Examiner* — Said Broome
(74) *Attorney, Agent, or Firm* — Oblon, McClelland, Maier & Neustadt, L.L.P.

(57) ABSTRACT

A shape data generation method includes: generating a target shape of transformation from plural tomographic images of an object; specifying, from among plural vertices of a first shape that is a reference shape of the object, plural first vertices, each first vertex of which satisfies a condition that a normal line of the first vertex passes through a point that is located on the target shape and is located on a boundary of the object in any one of the plural tomographic images; identifying, for each of the plural first vertices, a second vertex that internally divides a segment between the first vertex and the point; transforming the first shape so as to put each of the plural first vertices on a corresponding second vertex; setting a shape after the transforming to the first shape; and executing the first specifying and the subsequent processings a predetermined number of times.

10 Claims, 28 Drawing Sheets

(52) U.S. Cl.
CPC ... *G06T 2211/40* (2013.01); *G06T 2219/2016* (2013.01); *G06T 2219/2021* (2013.01)

(56) References Cited

U.S. PATENT DOCUMENTS

2003/0052169 A1* 3/2003 Tsikos .................. G06K 9/26
235/454
2008/0247636 A1* 10/2008 Davis .................. G06T 19/00
382/152

FOREIGN PATENT DOCUMENTS

| JP | 2007-098028 A | 4/2007 |
| JP | 2007-159927 A | 6/2007 |
| JP | 2007-164592 A | 6/2007 |
| JP | 2011-224143 A | 11/2011 |

OTHER PUBLICATIONS

X. Chen, et al., "Shape-Based Interpolation of MRI Volumes in TRUS/Fusion Based Biopsy" Proc. Intl. Soc. Mag. Reson. Med., No. 17, XP002751786, 2009, p. 4251.

Agma J. M. Traina, et al., "3D Reconstruction of Magnetic Resonance Imaging Using Largely Spaced Slices" Tenth IEEE Symposium on Computer-Based Medical Systems, XP010229287, Jun. 11, 1997, pp. 114-119.

I-Cheng Yeh, et al., "Template-Based 3D Model Fitting Using Dual-Domain Relaxation" IEEE Transactions on Visualization and Computer Graphics, vol. 17, No. 8, XP011373284, Aug. 1, 2011, pp. 1178-1190.

International Search Report dated Aug. 28, 2012 for PCT/JP2012/068636 dated Jul. 23, 2012 with English Translation.

Sorkine, O., et al. "Laplacian Surface Editing", *Eurographics Symposium on Geometry Processing*, 2004, The Eurographics Association, pp. 175-184.

Bookstein, Fred L., "Principal Warps: Thin-Plate splines and the Decomposition of Deformations", *IEEE Transactions on Pattern Analysis and Machine Intelligence*, vol. 11, No. 6, Jun. 1989, pp. 567-585.

* cited by examiner

SEGMENT IMAGES

SHAPE DATA GENERATION METHOD AND APPARATUS

CROSS-REFERENCE TO RELATED APPLICATIONS

This application is a continuing application, filed under 35 U.S.C. section 111(a), of International Application PCT/JP2012/068636, filed on Jul. 23, 2012, the entire contents of which are incorporated herein by reference.

FIELD

This invention relates to a shape data generation technique.

BACKGROUND

In the medical field, simulators such as operation simulators, organ simulators and the like are used to determine treatment plans, perform diagnosis, predict postoperative conditions, develop medical supplies and equipment and the like. In the simulation using these kinds of simulators, 3-dimensional shape data of an organ is used, however, often the generation of the 3-dimensional shape data of the organ is not easy. This is because the organs are located inside the body, so visual observation and direct measurement of the organs are not possible, and the shapes of the organs are very complex, fundamentally.

There is a conventional technique for generating a target shape by transforming a reference shape of an organ. Here, a method described below is known as a method for generating a target 3-dimensional shape data. Specifically, a doctor or the like observes tomographic images such as Computer Tomography (CT) images, Magnetic Resonance Imaging (MRI) images or the like, sets the boundaries of each portion of the organ, and draws boundary lines. Then, 3-dimensional shape data of an organ is obtained by laminating the tomographic images with the boundary lines.

However, it takes a long time to take one image in MRI or the like, sometimes sufficient tomographic images are not obtained (namely, a slice interval becomes long.) In this case, it is not possible to generate 3-dimensional shape data with high accuracy. For example, a shape that does not exist in a real organ is formed.

Moreover, there's a technique for transforming a reference model so as to optimize a predetermined evaluation function by using a model fitting method to generate a model of a target object. However, when resolution of a 3-dimensional image used for extracting the target object is low, 3-dimensional shape data with high accuracy is not obtained.

Moreover, there's a technique using a transformable model whose surface is formed by a mesh network. In this method, by repeatedly executing a step of newly calculating a position of a network point, 3-dimensional structured segmentation is generated from 2-dimensional images.

Moreover, there's a transformation method using a landmark as a parameter. In this transformation method, source landmarks are deployed on an area to be transformed, target landmarks are deployed on positions after transformation, and then transformation is executed. A method like this causes a problem that an unnatural shape would form unless the source landmarks and the target landmarks are set properly.

Furthermore, even though conventional techniques described above are used, accuracy of 3-dimensional shape data becomes low when sufficient tomographic images are not obtained.

Patent Document 1: Japanese Laid-open Patent Publication No. 2007-098028
Patent Document 2: Japanese Laid-open Patent Publication No. 2007-164592
Patent Document 3: Japanese Laid-open Patent Publication No. 2002-329216
Patent Document 4: Japanese Laid-open Patent Publication No. 2004-265337
Non-Patent Document 1: "Principal Warps: Thin-Plate Splines and the Decomposition of Deformations", IEEE TRANSACTIONS ON PATTERN ANALYSIS AND MACHINE INTELLIGENCE, Fred L. Bookstein, VOL. 11, NO. 6, June 1989
Non-Patent Document 2: "Laplacian surface editing", SGP '04 Proceedings of the 2004 Eurographics/ACM SIGGRAPH symposium on Geometry processing, O. Sorkine, Tel Aviv University, D. Cohen-Or, Tel Aviv University, Y. Lipman, Tel Aviv University, M. Alexa, Darmstadt University of Technology, C. Roessl, Max-Planck Institut fuer Informatik, Saarbruecken, H.-P. Seidel, Max-Planck Institut fuer Informatik, Saarbruecken

SUMMARY

A shape data generation method relating to this invention includes: generating data of a target shape of transformation from plural tomographic images of an object; first specifying, from among plural vertices of a first shape that is a reference shape of the object and is to be transformed, plural first vertices, each first vertex of which satisfies a condition that a normal line of the first vertex passes through a certain point that is located on the target shape and is located on a boundary of the object in any one of the plural tomographic images; second specifying, for each of the plural first vertices, a second vertex that internally divides a segment between the first vertex and the certain point; transforming the first shape so as to put each of the plural first vertices on a corresponding second vertex; setting a shape after the transforming to the first shape; and executing the first specifying, the second specifying, the transforming and the setting a predetermined number of times.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
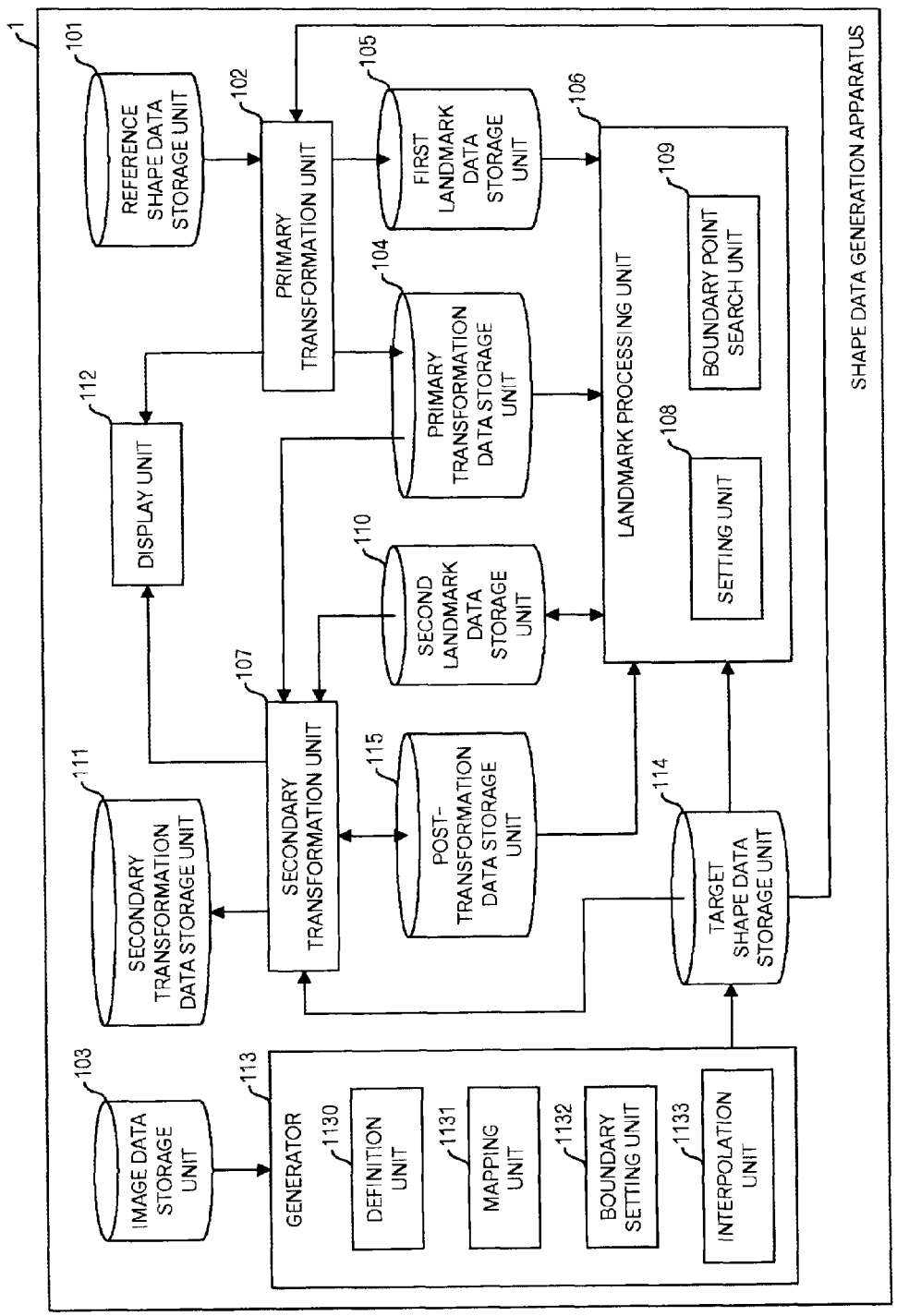
FIG. 1 is a functional block diagram of a shape data generation apparatus relating to this embodiment.

FIG. 1 illustrates a functional block diagram of a shape data generation apparatus 1 relating to this embodiment. In the example in FIG. 1, the shape data generation apparatus 1 includes a reference shape data storage unit 101, a primary transformation unit 102, an image data storage unit 103, a primary transformation data storage unit 104, a first landmark data storage unit 105, a landmark processing unit 106, a secondary transformation unit 107, a second landmark data storage unit 110, a secondary transformation data storage unit 111, a display unit 112, a generator 113, a target shape data storage unit 114, and a post-transformation data storage unit 115. Moreover, the landmark processing unit 106 includes a setting unit 108 and a boundary point search unit 109, and the generator 113 includes a definition unit 1130, a mapping unit 1131, a boundary setting unit 1132, and an interpolation unit 1133.

The generator 113 generates 3-dimensional shape data of a target shape from segment image data stored in the image data storage unit 103, and stores the 3-dimensional shape data of the target shape in the target shape data storage unit 114. Specifically, the definition unit 1130 executes a processing for defining a bounding box that contains the target shape. The mapping unit 1131 relates voxels in a bounding box that contains segment images to voxels in the bounding box that contains the target shape. The boundary setting unit 1132 executes a processing for allocating a predetermined brightness value ("2" in this embodiment) to a boundary between a heart and non-heart. The interpolation unit 1133 allocates a brightness value to each voxel that does not have a brightness value and is in the bounding box, which contains the target shape.

The primary transformation unit 102 uses data that is stored in the reference shape data storage unit 101 and data that is stored in the target shape data storage unit 114 to perform a primary transformation processing, which will be described later, and stores the processing results in the primary transformation data storage unit 104 and first landmark data storage unit 105. In addition, the primary transformation unit 102 instructs the display unit 112 to display a screen for causing a user to designate a landmark. The setting unit 108 and the boundary point search unit 109 in the landmark processing unit 106 use data that is stored in the target shape data storage unit 114, data that is stored in the primary transformation data storage unit 104, data that is stored in the post-transformation data storage unit 115, data that is stored in the first landmark data storage unit 105, and data that is stored in the second landmark data storage unit 110 to perform a landmark setting processing and a boundary search processing which will be described later, and stores the processing results in the second landmark data storage unit 110. The secondary transformation unit 107 uses data that is stored in the target shape data storage unit 114, data that is stored in the primary transformation data storage unit 104, data that is stored in the post-transformation data storage unit 115, and data that is stored in the second landmark data storage unit 110 to perform a processing, and stores the processing results in the post-transformation data storage unit 115 or the secondary transformation data storage unit 111. In addition, the secondary transformation unit 107 instructs the display unit 112 to display data that is stored in the secondary transformation data storage unit 111. The display unit 112 displays data on a display device in reaction to instructions from the primary transformation unit 102 and the secondary transformation unit 107.

The data for the standard shape of a heart (herein after, referred to as reference shape) is stored in the reference shape data storage unit 101. More specifically, Standard Triangulated Language (STL) data that contains information about the vertices of the shape and information about connections of vertices is stored. However, the data format is not limited to the format of the STL data.

Figure 2:
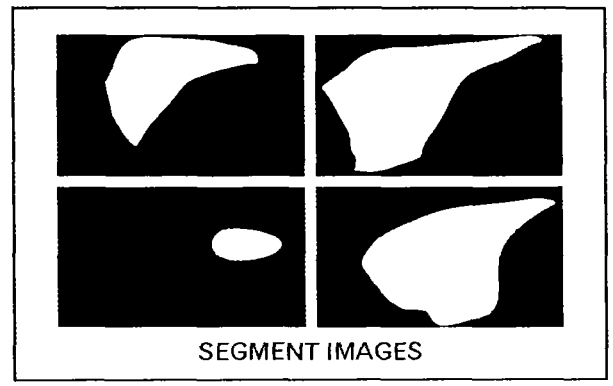
FIG. 2 is a diagram depicting an example of a segment image.

FIG. 2 illustrates an example of segment image data that is stored in the image data storage unit 103. In FIG. 2, data of four segment images are illustrated. The segment image data is obtained by painting over a portion surrounded by the boundary with a predetermined brightness value (hereinafter, referred to a label value) for CT images of a certain patient's heart. Each point in the segment image data has 3-dimensional coordinates. In this embodiment, the segment image data is used to obtain 3-dimensional shape data of the target shape that is a target of transformation.

Next, the operation of the shape data generation apparatus 1 that is illustrated in FIG. 1 will be explained by using FIGS. 3 to 33. The shape data generation apparatus 1 performs a processing for transforming the reference shape so as to come close to the target shape. Firstly, a processing for generating the 3-dimensional shape data of the target shape from the segment image data will be explained by using FIGS. 3 to 12.

Figure 3:
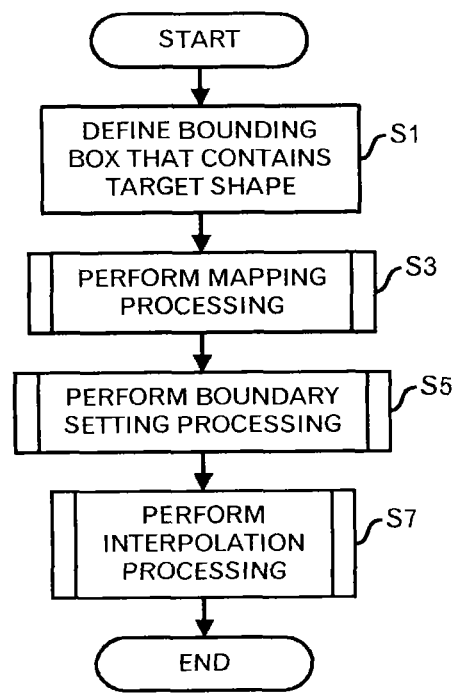
FIG. 3 is a diagram depicting a processing flow of a processing for generating 3-dimensional data of a target shape.

The definition unit 1130 in the generator 113 reads out the segment image data stored in the image data storage unit 103. Then, the definition unit 1130 defines the bounding box that contains the target shape (FIG. 3: step S1).

When a slice interval of the segment images is long, the length in a z-axis direction of a voxel in the bounding box that contains the target shape becomes longer. Incidentally, a voxel is an element of a grid image in the 3-dimensional image data, which corresponds to a pixel that is an element of a rectangular image in the 2-dimensional image data. Therefore, a processing described below is executed to make a voxel in the bounding box that contains the target shape a cube.

(1) The lower limit coordinates of the bounding box that contains the target shape=the lower limit coordinates of the bounding box that contains the segment images;

(2) the upper limit coordinates of the bounding box that contains the target shape=the upper limit coordinates of the bounding box that contains the segment images; and (3) the number of grid points in the x-axis direction of the bounding box that contains the target shape=1+(the upper limit x-coordinate of the bounding box−the lower limit x-coordinate of the bounding box)/voxel size in the x-axis direction or voxel size in the y-axis direction of the bounding box that contains the segment images (incidentally, the numbers of grid points in the y-axis direction and the z-axis direction can be calculated similarly).

However, if a setting is performed as described above, the position of the upper limit is sometimes misaligned. Therefore, the upper limit is reset as described below:

(4) the upper limit x-coordinate of the bounding box that contains the target shape=the lower limit x-coordinate of the bounding box that contains the segment images+voxel size in the x-axis direction or voxel size in the y-axis direction of the bounding box that contains the segment images*(the number of grid points in the x-axis direction−1) (incidentally, the y-coordinate and the z-coordinate can be calculated similarly).

Here, the bounding box that contains the segment images is defined by column vector $B_{min}=(x_{min}, y_{min}, z_{min})^T$ that represents lower limit and column vector $B_{max}=(x_{max}, y_{max}, z_{max})^T$ that represents upper limit. $x_{min}$ is the minimum of the x-coordinates, and $x_{max}$ is the maximum of the x-coordinates. $y_{min}$ is the minimum of the y-coordinates, and $y_{max}$ is the maximum of the y-coordinates. $z_{min}$ is the minimum of the z-coordinates, and $z_{max}$ is the maximum of the z-coordinates.

Figure 4:
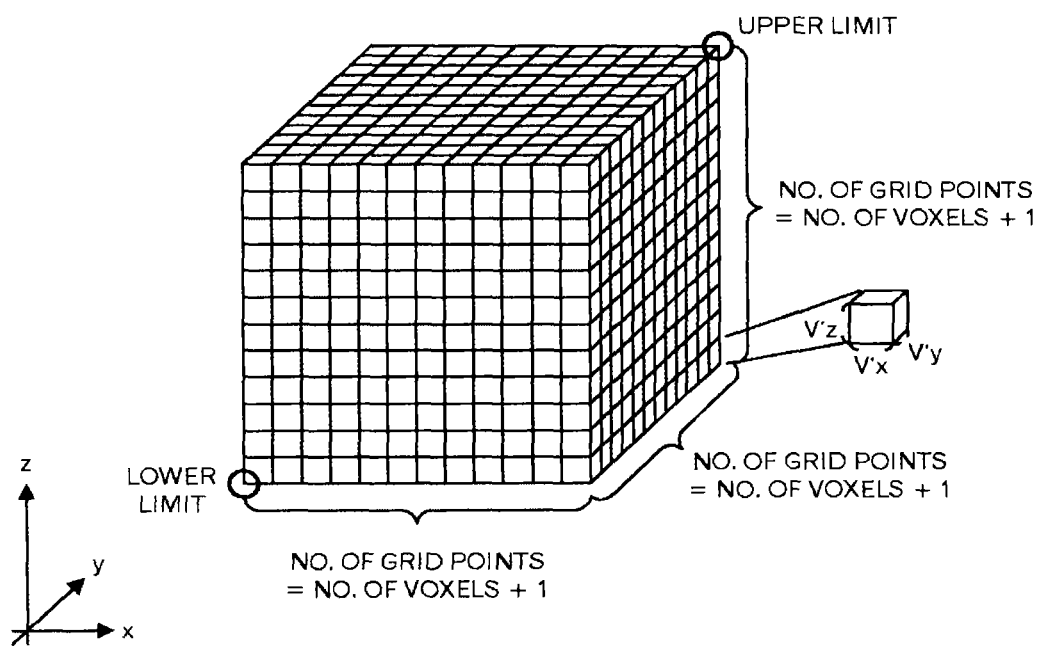
FIG. 4 is a diagram depicting an example of a bounding box that contains the target shape.

A bounding box illustrated in FIG. 4 is defined by the processing of the step S1. A range of the bounding box is defined by the coordinate of the lower limit and the coordinate of the upper limit. For each voxel in the bounding box, the length of the voxel in the x-axis direction is $v'_x$, the length of the voxel in the y-axis direction is $v'_y$, and the length of the voxel in the z-axis direction is $v'_z$. Here, $v'_x=v'_y=v'_z$ holds. The number of grid points in each axis is the number of voxels in the axis plus 1. Data of the bounding box defined is stored in the target shape data storage unit 114. "0" is set to each voxel in the bounding box as an initial value of the brightness value.

Returning to the explanation of the FIG. 3, the mapping unit 1131 executes a mapping processing (step S3). The mapping processing is explained using FIGS. 5 and 6.

Figure 5:
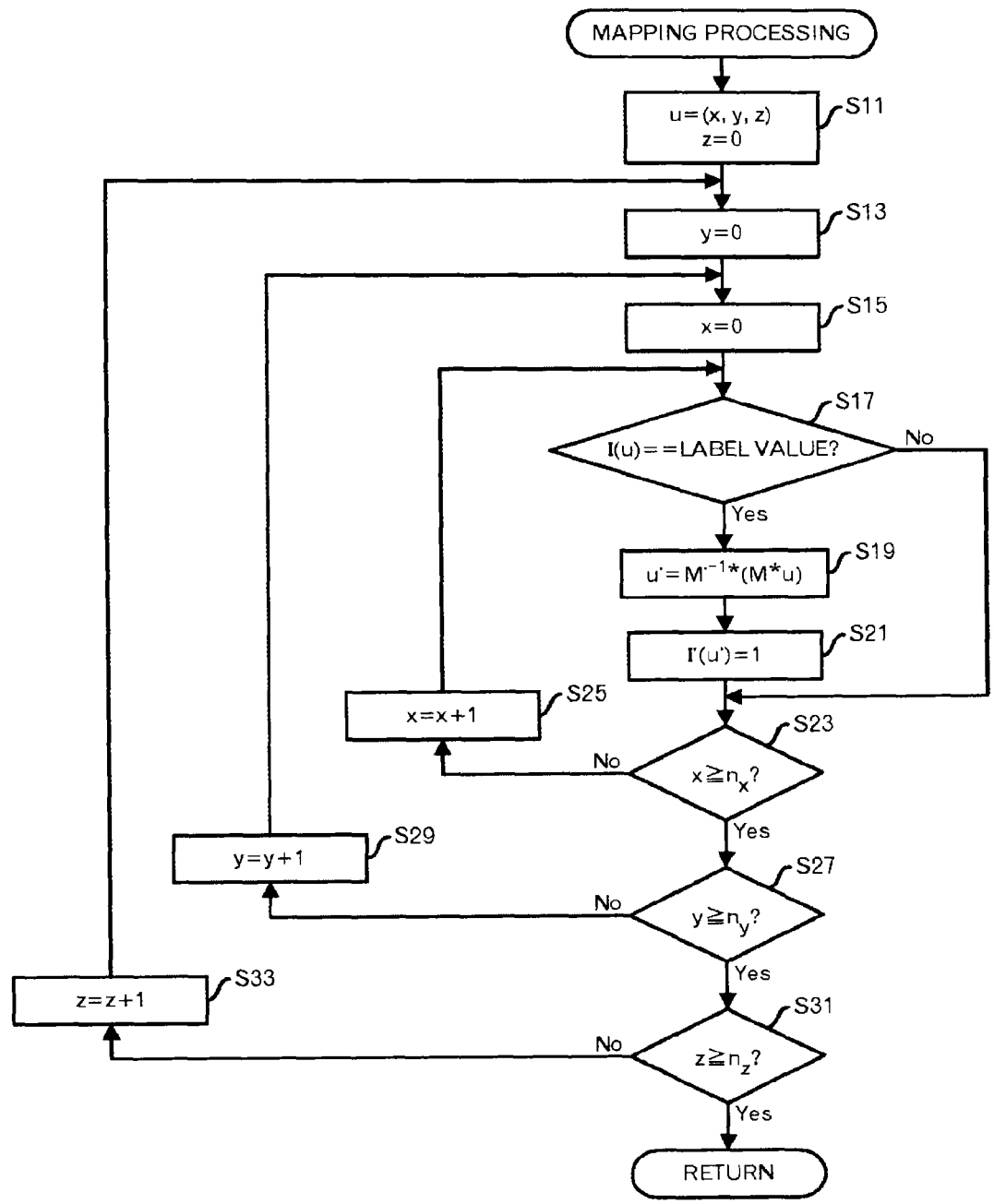
FIG. 5 is a diagram depicting a processing flow of a mapping processing.

The mapping unit 1131 sets z=0 as the z-coordinate of the position u(x, y, z) in the segment images (FIG. 5: step S11). Here, assume u∈[0, $n_x$]*[0, $n_y$]*[0, $n_z$]⊂I$^3$. $n_x$ is the number of voxels in the x-axis direction in the bounding box that contains the segment images, $n_y$ is the number of voxels in the y-axis direction, and $n_z$ is the number of voxels in the z-axis direction. I(x, y, z) is a brightness value of u(x, y, z) in the bounding box that contains the segment images.

Moreover, in the following, when $n_x$ is the number of voxels in the x-axis direction in the bounding box that contains the segment images, $n_y$ is the number of voxels in the y-axis direction, and $n_z$ is the number of voxels in the z-axis direction, the number of grid points in the z-axis direction is $n_z+1$. And assume that the size of the voxel in the x-axis direction is $v_x$, the size of the voxel in the y-axis direction is $v_y$, and the size of the voxel in the z-axis direction is $v_z$.

Returning to the explanation of the FIG. 5, the mapping unit 1131 sets y=0 as the y-coordinate of u (step S13).

The mapping unit 1131 sets x=0 as the x-coordinate of u (step S15).

The mapping unit 1131 determines whether (u)==the label value holds (step S17). Namely, the mapping unit 1131 determines whether u is a voxel that is inside the boundary (namely, inside the heart). When I(u)==the label value does not hold (step S17: No route), processing shifts to a processing of step S23. When I(u)==the label value holds (step S17: Yes route), the mapping unit 1131 sets M'$^{-1}$*(M*u) as a position u' in the bounding box that contains the target shape (step S19). In addition, the mapping unit 1131 sets "1" as a brightness value I'(u') at a position u' in the bounding box that includes the target shape (step S21). Here, u'∈ I$^3$ holds. Moreover, M and M' are defined as described below.

$$M = \begin{pmatrix} v_x & 0 & 0 \\ 0 & v_y & 0 \\ 0 & 0 & v_z \end{pmatrix}$$

$$M' = \begin{pmatrix} v'_x & 0 & 0 \\ 0 & v'_y & 0 \\ 0 & 0 & v'_z \end{pmatrix}$$

Incidentally, the brightness value of the position u', which is stored in the target shape data storage unit 114, is updated from 0 to 1 by the processing of the step S21.

The mapping unit 1131 determines whether $x \geq n_x$ holds (step S23). When $x \geq n_x$ does not hold (step S23: No route), the mapping unit 1131 increments the x-coordinate of u(x, y, z) by 1 (step S25), then the processing returns to the processing of the step S17.

When $x \geq n_x$ holds (step S23: Yes route), the mapping unit 1131 determines whether $y \geq n_y$ holds (step S27). When $y \geq n_y$ does not hold (step S27: No route), the mapping unit 1131 increments the y-coordinate of the u(x, y, z) by 1 (step S29), then the processing returns to the processing of the step S15.

When $y \geq n_y$ holds (step S27: Yes route), the mapping unit 1131 determines whether $z \geq n_z$ holds (step S31). When $z \geq n_z$ does not hold (step S31: No route), the mapping unit 1131 increments the z-coordinate of the u(x, y, z) by 1 (step S33), then the processing returns to the processing of the step S13. On the other hand, when $z \geq n_z$ holds (step S31: Yes route), the processing returns to the calling source processing.

Figure 6:
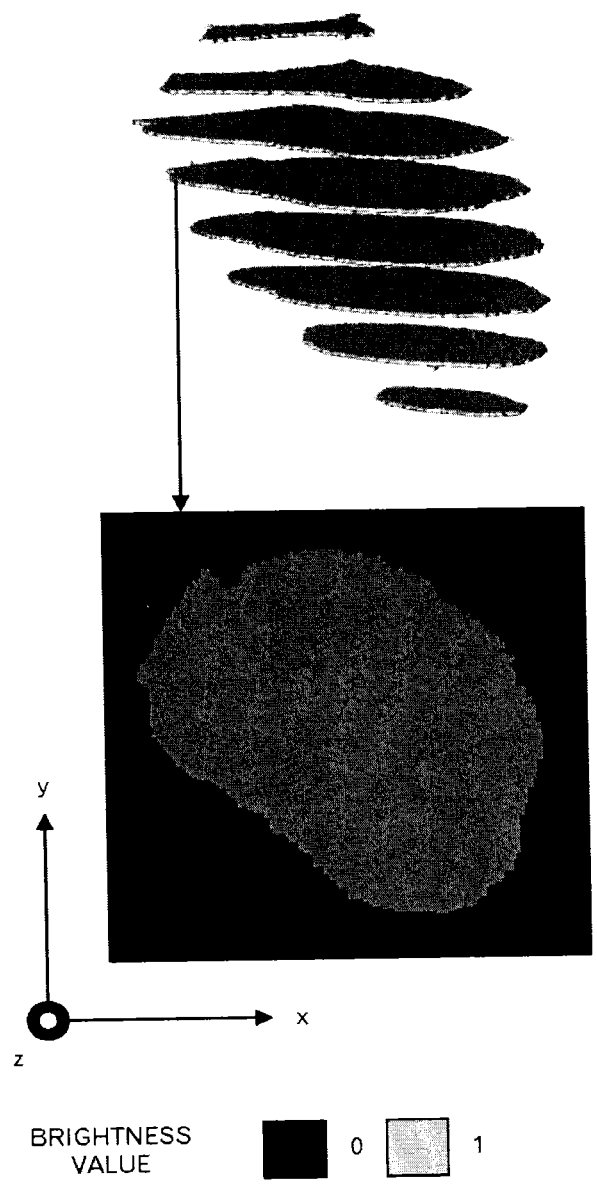
FIG. 6 is a diagram to explain results of the mapping processing.

By performing the aforementioned processing, a brightness value of a boundary between a heart or the inside of the heart and non-heart becomes 1, and a brightness value of the portion that is not the heart becomes 0 in the target shape. Upper part of FIG. 6 illustrates 3-dimensional shape data of the target shape in this phase, lower part of FIG. 6 illustrates a portion of generated 3-dimensional shape data observed from the z-axis direction. In this phase, in the z-axis direction, a brightness value is given to only a portion in which the segment image data exist.

Returning to the explanation of FIG. 3, the boundary setting unit 1132 executes the boundary setting processing (step S5). The boundary setting processing is explained using FIGS. 7 and 8.

Figure 7:
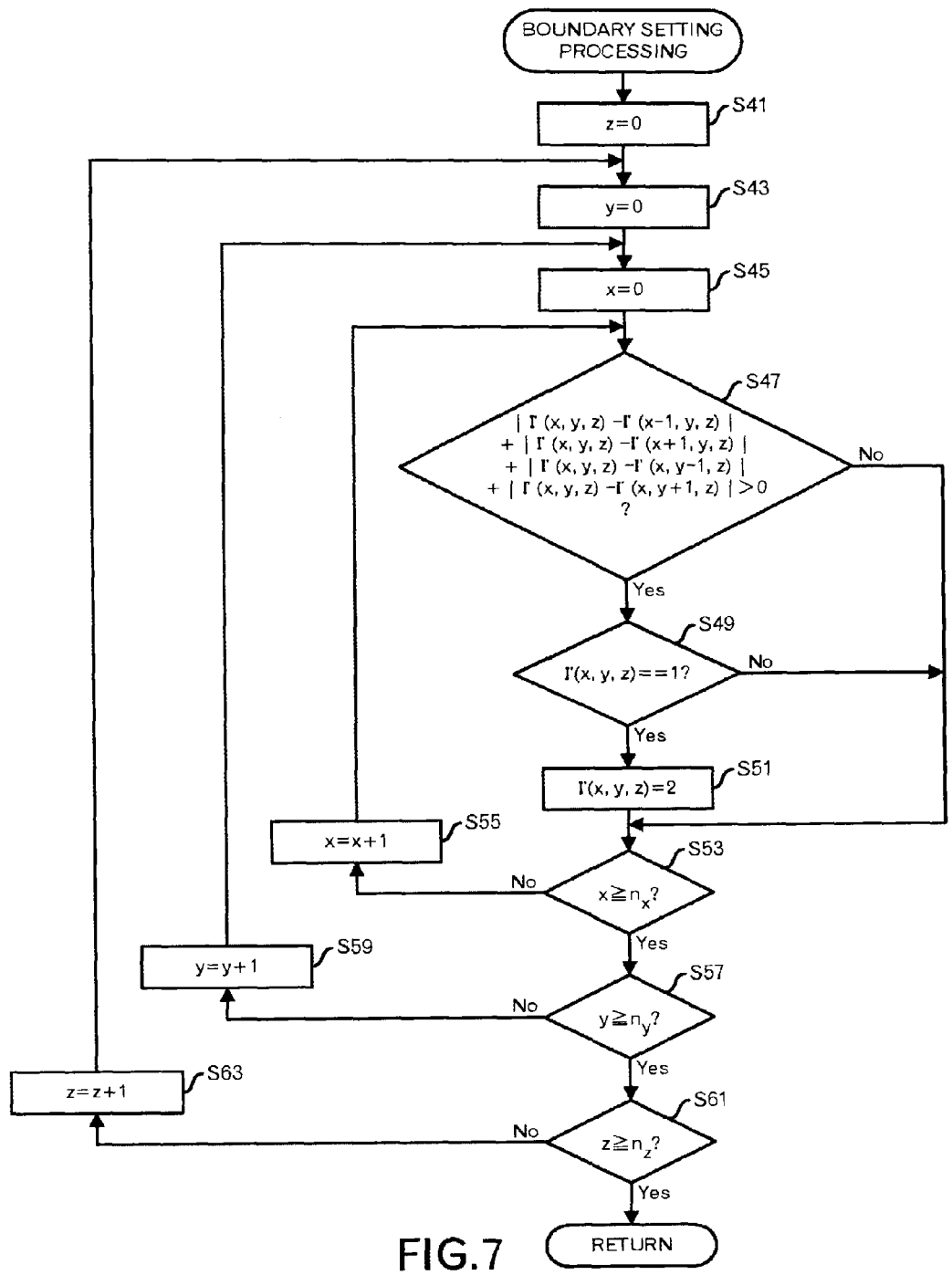
FIG. 7 is a diagram depicting a processing flow of a boundary setting processing.

Firstly, the boundary setting unit 1132 sets "z=0" as the z-coordinate of the brightness value I'(x, y, z) at the position u' on the target shape (FIG. 7: step S41).

The boundary setting unit 1132 sets "y=0" as the y-coordinate of I' (step S43).

The boundary setting unit 1132 sets "x=0" as the x-coordinate of I' (step S45).

The boundary setting unit 1132 determines whether a following expression holds (step S47):

$$|I'(x, y, z)-I'(x-1, y, z)|+|I'(x, y, z)-I'(x+1, y, z)|+|I'(x, y, z)-I'(x, y-1, z)|+|I'(x, y, z)-I'(x, y+1, z)|>0$$

In the step S47, the boundary setting unit 1132 determines whether or not there's a difference between the brightness value of u'(x, y, z) and brightness values of points around u'(x, y, z).

$$|I'(x, y, z)-I'(x-1, y, z)|+|I'(x, y, z)-I'(x+1, y, z)|+|I'(x, y, z)-I'(x, y-1, z)|+|I'(x, y, z)-I'(x, y+1, z)|>0$$

When the aforementioned expression does not hold (step S47: No route), the processing shifts to a processing of step S53 because u' is not the boundary between the heart and the non-heart.

$$|I'(x, y, z)-I'(x-1, y, z)|+|I'(x, y, z)-I'(x+1, y, z)|+|I'(x, y, z)-I'(x, y-1, z)|+|I'(x, y, z)-I'(x, y+1, z)|>0$$

When the aforementioned expression holds (step S47: Yes route), the boundary setting unit 1132 determines whether I'(x, y, z)==1 holds (step S49).

When I'(x, y, z)==1 does not hold (step S49: No route), the processing shifts to a processing of the step S53 because u' is not the boundary between the heart and the non-heart. On the other hand, when I'(x, y, z)==1 holds (step S49: Yes route), u' is the boundary between the heart and the non-heart. Therefore, the boundary setting unit 1132 sets "2" as I'(x, y, z) (step S51). The brightness value of the position u', which is stored in the target shape data storage unit 114, is updated from 1 to 2 by the processing of the step S51.

The boundary setting unit 1132 determines whether $x \geq n_x$ holds (step S53). When $x \geq n_x$ does not hold (step S53: No route), the boundary setting unit 1132 increments the x-coordinate of u'(x, y, z) by 1 (step S55), then the processing returns to the processing of the step S47.

When $x \geq n_x$ holds (step S53: Yes route), the boundary setting unit 1132 determines whether $y \geq n_y$ holds (step S57). When $y \geq n_y$ does not hold (step S57: No route), the boundary setting unit 1132 increments the y-coordinate of u'(x, y, z) by 1 (step S59), then the processing returns to the processing of the step S45.

When $y \geq n_y$ holds (step S57: Yes route), the boundary setting unit 1132 determines whether $z \geq n_z$ holds (step S61). When $z \geq n_z$ does not hold (step S61: No route), the boundary setting unit 1132 increments the z-coordinate of u'(x, y, z) by 1 (step S63), then the processing returns to the processing of the step S43. On the other hand, when $z \geq n_z$ holds (step S61: Yes route), the processing returns to the calling source processing.

Figure 8:
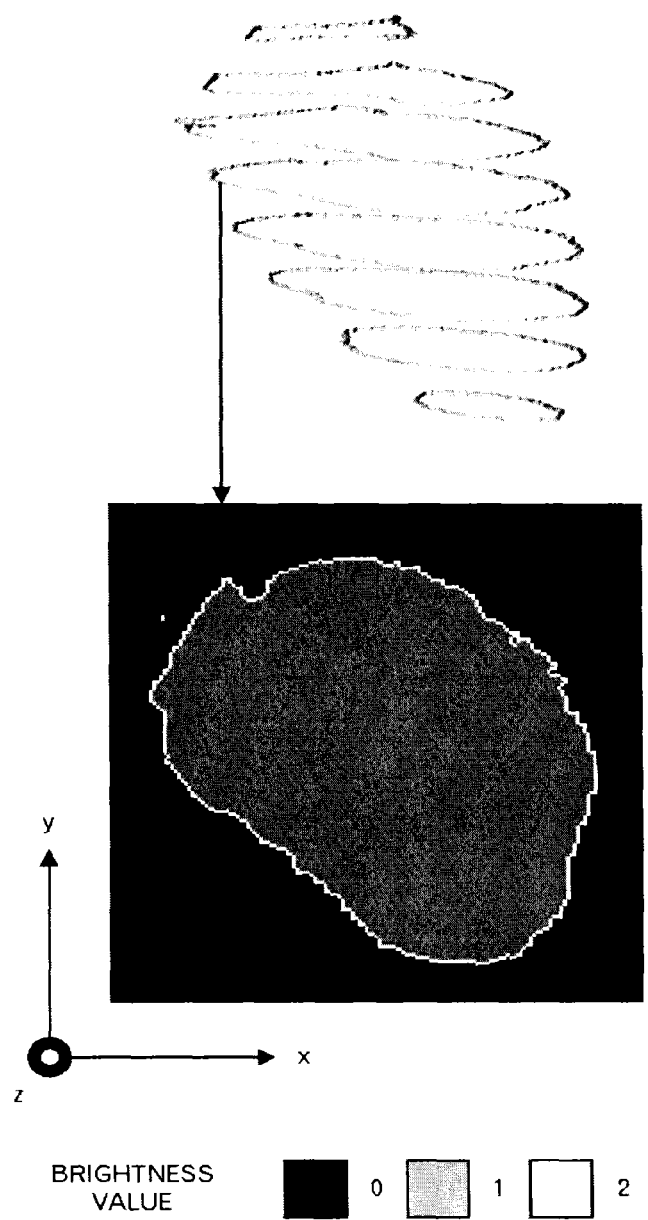
FIG. 8 is a diagram to explain results of the boundary setting processing.

By performing the aforementioned processing, the brightness value inside the heart in the target shape becomes 1, the brightness value on the boundary between the heart and the non-heart becomes 2, and the brightness value of the non-heart becomes 0. Upper part of FIG. 8 illustrates 3-dimensional shape data of the target shape at this phase, and lower part of FIG. 8 illustrates a part of the generated 3-dimensional shape data observed from the z-axis direction. The upper part of FIG. 8 illustrates only the boundary in order to make it easy to recognize the boundary. At this phase, in the z-axis direction, the brightness value is given only to a portion in which the segment image data exist.

Returning to the explanation of FIG. 3, the interpolation unit 1133 executes an interpolation processing (step S7). The interpolation processing is explained by FIGS. 9 to 12.

Figure 9:
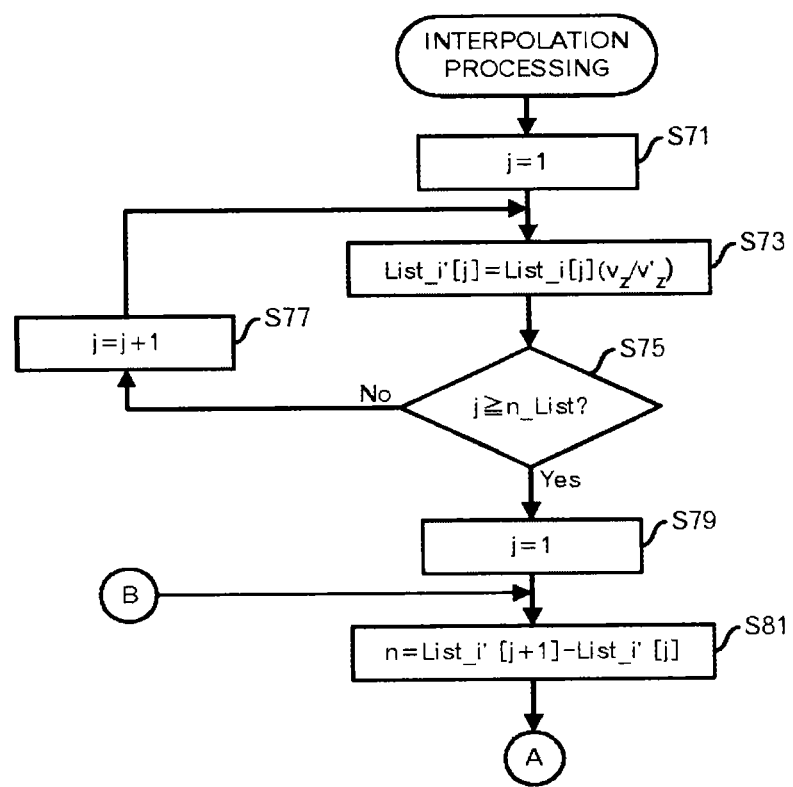
FIG. 9 is a diagram depicting a processing flow of an interpolation processing.
Figure 10:
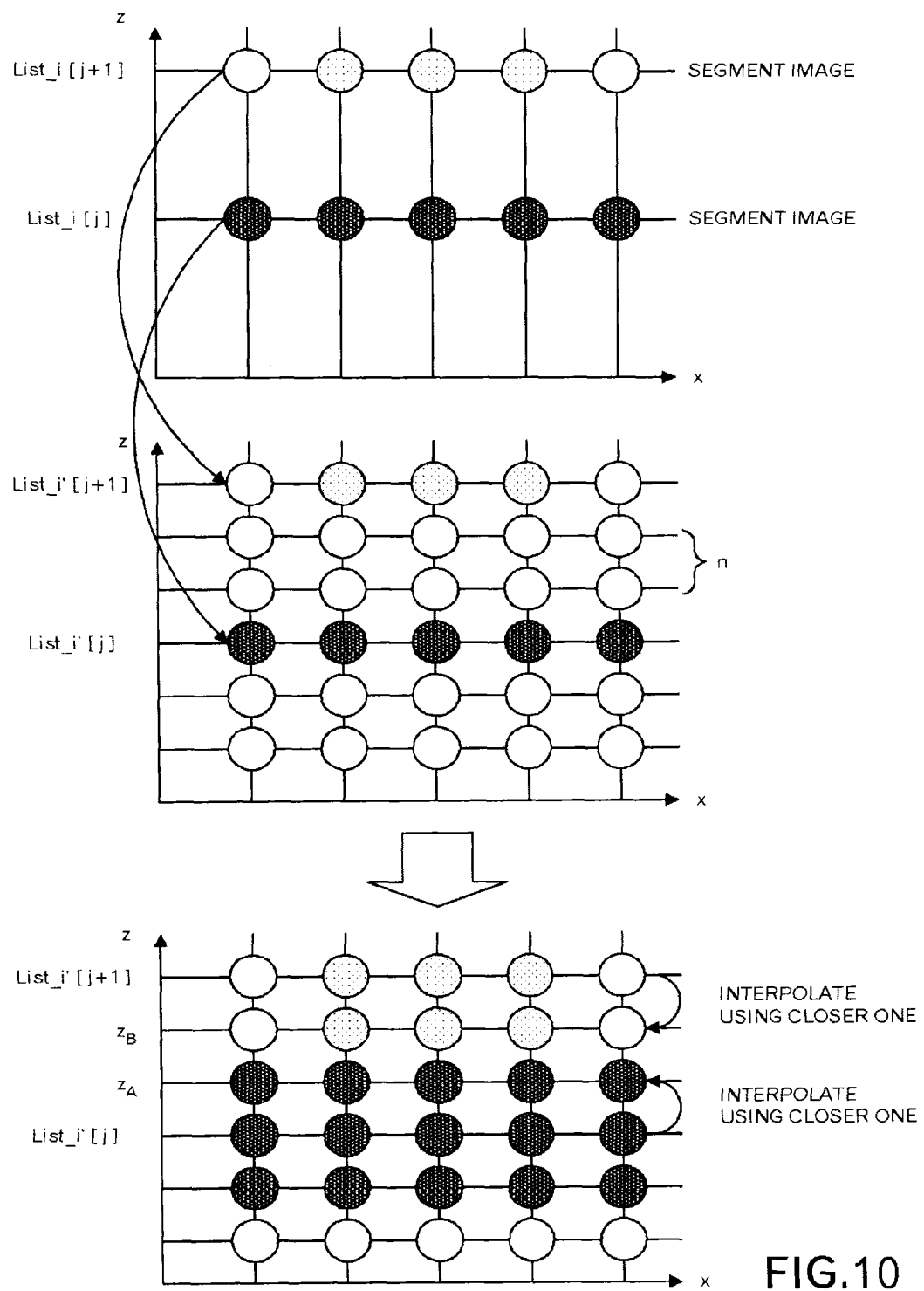
FIG. 10 is a diagram to explain the interpolation processing.

Firstly, the interpolation unit 1133 sets "1" as a value of a variable j for counting the number of the segment images (FIG. 9: step S71).

The interpolation unit 1133 sets List_i'[j]=List_i[j]($v_z/v'_z$) (step S73). Here, List_i[j] is the z-coordinate of the j-th segment image data. Therefore, List_i'[j] is the z-coordinate of the bounding box that contains the target shape, and the z-coordinate corresponds to the z-coordinate of the j-th segment image data. As illustrated in upper and middle parts of FIG. 10, segment image data whose z-coordinate is List_i[j+1] is associated with the target shape data whose z-coordinate is List_i'[j+1]. In addition, segment image data whose z-coordinate is List_i[j] is associated with the target shape data whose z-coordinate is List_i'[j].

The interpolation unit 1133 determines whether j≥n_List holds (step S75). n_List is the number of the segment images actually created by the user. When j≥n_List does not hold (step S75: No route), the interpolation unit 1133 increments j by 1 in order to process the next segment image data (step S77), then the processing returns to the processing of the step S73.

On the other hand, when j≥n_List holds (step S75: Yes route), the interpolation unit 1133 sets "1" as the value of the variable 1 for counting the segment images (step S79).

The interpolation unit 1133 sets List_i'[j+1]−List_i'[j] as n (step S81). n is the number of z-coordinates that do not have brightness values and are located in between the z-coordinate List_i'[j+1] and the z-coordinate List_i'[j]. The processing shifts to step S83 in FIG. 11 through terminal A.

Figure 11:
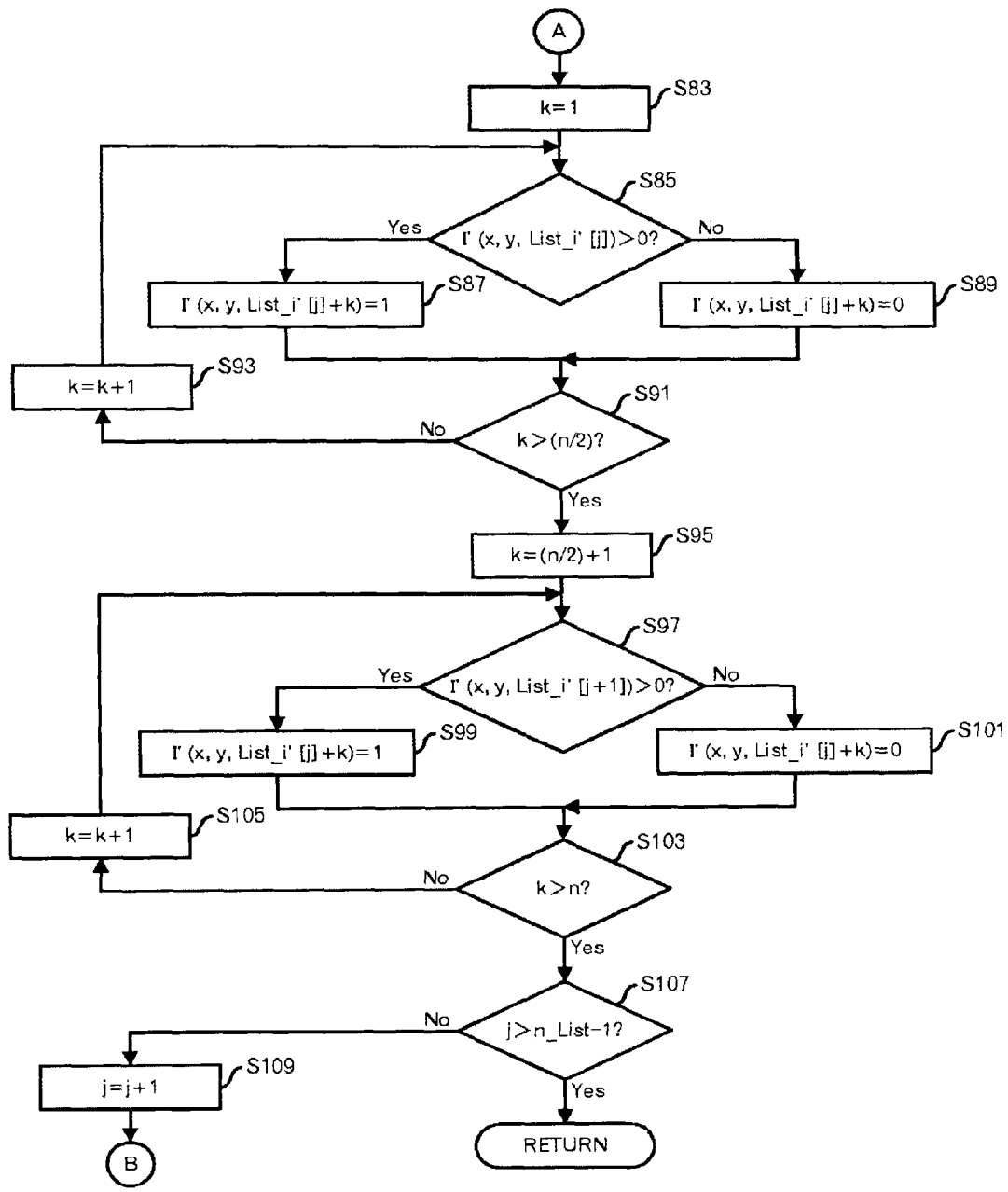
FIG. 11 is a diagram depicting a processing flow of the interpolation processing.

Shifting to the explanation of the processing in FIG. 11, the interpolation unit 1133 sets "1" as a value of a variable k for counting the number of z-coordinates (step S83).

The interpolation unit 1133 determines whether I'(x, y, List_i'[j])>0 holds (step S85). When I'(x, y, List_i'[j])>0 holds (step S85: Yes route), the interpolation unit 1133 sets "1" as I'(x, y, List_i'[j]+k) (step S67). The brightness value of the position u', which is stored in the target shape data storage unit 114, is updated from 0 to 1 by the processing of the step S87. On the other hand, when I'(x, y, List_i'[j])>0 does not hold (step S85: No route), the interpolation unit 1133 sets "0" as I'(x, y, List_i'[j]+k) (step S89). In the processing of the step S89, "0" is maintained for the brightness value of the position u', which is stored in the target shape data storage unit 114.

The interpolation unit 1133 determines whether k>(n/2) holds (step S91). When k>(n/2) does not hold (step S91: No route), the interpolation unit 1133 increments k by 1 (step S93), then the processing returns to the processing of the step S85.

In the processing from the steps S83 to 393, the brightness value that is the same as I'(x, y, List_i'[j]) is set because z-coordinate List_i'[j]+k is closer to z-coordinate List_i'[j] than z-coordinate List_i'[j+1]. For example, as illustrated in the lower part of FIG. 10, when List_i'[j]+k=$z_A$ holds, because $z_A$ is closer to z-coordinate List_i'[j] than z-coordinate List_i'[j+I]. However, even though I'(x, y, List_i'[j])=2 holds, not "2" but "1" is set as I'(x, y, List_i'[j]+k) in order to give brightness value "2" only to the boundary set by the user.

Returning to the explanation of the FIG. 11, when k>(n/2) holds (step S91: Yes route), the interpolation unit 1133 sets (n/2)+1 as the value of the variable k for counting the number of z-coordinates (step S95).

The interpolation unit 1133 determines whether I'(x, y, List_i'[j+1])>0 holds (step S97). When I'(x, v, List_i'[j+1])>0 holds (step S97: Yes route), the interpolation unit 1133 sets "1" as I'(x, y, List_i'[j]+k) (step S99). The brightness value of the position u', which is stored in the target shape data storage unit 114, is updated from 0 to 1 by the processing of the step S99. On the other hand, when I'(x, y, List_i'[j])>0 does not hold (step S97: No route), the interpolation unit 1133 sets "0" as I'(x, y, List_i'[j]+k) (step S101). In the processing of the step S101, "0" is maintained for the brightness value of the position which is stored in the target shape data storage unit 114.

The interpolation unit 1133 determines whether k>n holds (step S103). When k>n does not hold (step S103: No route), the interpolation unit 1133 increments k by 1 (step S105), then the processing returns to the processing of the step S97.

In the processing from the step S95 to step S105, the brightness value that is the same as I'(x, v, List_i'[j+1]) is set because z-coordinate List_i'[j]+k is closer to z-coordinate List_i'[j+1] than z-coordinate List_i'[j]. For example, as illustrated in the lower part of FIG. 10, when List_i'[j]+k=$z_B$ holds, I'(x, y, List_i'[j]+k)=I'(x, y, List_i'[j+1]) is set because $z_B$ is closer to z-coordinate List_i'[j+1] than z-coordinate List_i'[j]. However, even though I'(x, y, List_i'[j+1])=2 holds, not "2" but "1" is set as I'(x, y, List_i'[j]+k) in order to give brightness value "2" only to the boundary set by the user.

Returning to the explanation of the FIG. 11, when k>n holds (step S103: Yes route), the interpolation unit 1133 determines whether j>n_List−1 holds (step S107). When j>n_List−1 does not hold (step S107: No route), the interpolation unit 1133 increments j by 1 (step S109) because there's a grid point that does not have a brightness value.

The processing returns to the processing of the step S81 in FIG. 9 through terminal B. On the other hand, when j>n_List−1 holds (step S107: Yes route), the processing returns to the calling source processing.

Returning to the explanation of the FIG. 3, the processing ends when the interpolation processing (step S7) ends.

Figure 12:
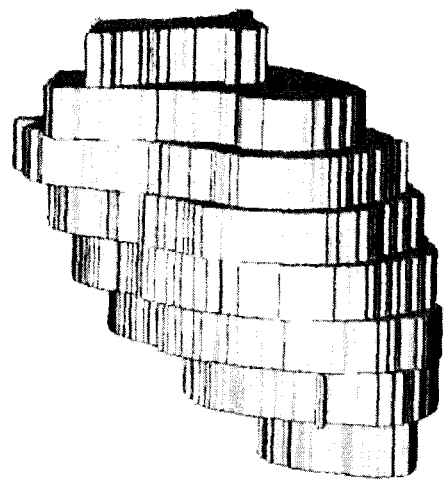
FIG. 12 is a diagram to explain results of the interpolation processing.

As described above, by preliminarily arranging to be able to discern the boundary between the heart and the non-heart in the target shape (namely, preliminarily setting "2" as the brightness value), transformation is performed so as to match the boundary of the target shape to the boundary of the reference shape. This enables to generate 3-dimensional shape data with high, accuracy. Incidentally, by performing the processing so far, 3-dimensional shape data, for example illustrated in FIG. 12, is generated. In this 3-dimensional shape data, a shape of a voxel becomes a cubic shape.

Next, a transformation processing of a reference shape which is carried out so as to come close to the target shape will be explained using FIGS. 13 to 33.

Figure 13:
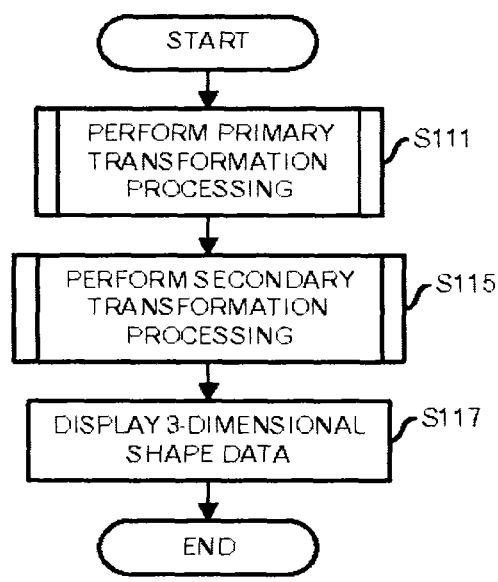
FIG. 13 is a diagram depicting a processing flow of a processing for generating 3-dimensional data.

First, the primary transformation unit 102 performs the primary transformation processing (FIG. 13: step S111). The primary transformation processing will be explained by using FIGS. 14 to 17. In the primary transformation processing, rough alignment of the reference shape and target shape is performed.

Figure 14:
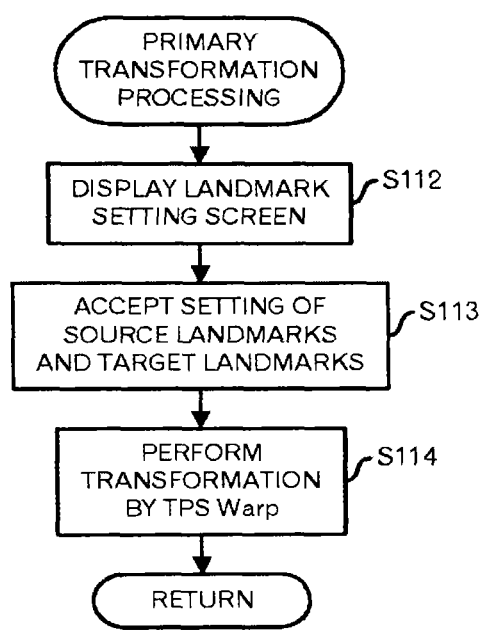
FIG. 14 is a diagram depicting a processing flow of a primary transformation processing.

First, the primary transformation unit 102 reads the reference shape data from the reference shape data storage unit 101, and reads the target shape data from the target shape data storage unit 114. Then, the primary transformation unit 102 instructs the display unit 112 to display a landmark setting screen that includes the reference shape data and the target shape data. The display unit 112 displays the landmark setting screen on the display device in response to the instruction from the primary transformation unit 102 (FIG. 14: step S112).

The user watches the landmark setting screen that is displayed on the display device and carries out rough alignment of the reference shape and the target shape. More specifically, (1) the user sets source landmarks at predetermined positions in the reference shape. (2) The user then sets target landmarks at positions in the target shape, which correspond to the positions where the source landmarks are arranged. The predetermined positions are characteristic positions of the heart, for example, the four annular valves, apex, bottom section of the right ventricle fluid surface, myocardial boundary (for example, the boundary between the right ventricle and left ventricle), the end surfaces of the four pulmonary veins, superior vena cava, and the inferior vena cava.

The primary transformation unit 102 then accepts settings for the source landmarks and target landmarks, and stores the data for the source landmarks and the target landmarks (for example, 3-dimensional coordinates) in the first landmark data storage unit 105 (step S113).

Then the primary transformation unit 102 performs a processing, using a method such as the Thin Plate Spline (TPS) Warp method, which will be described later, to transform the reference shape according to the landmark data stored in the first landmark data storage unit 105 (step S114). The primary transformation unit 102 then stores the processing results, which are data of the shape after the primary transformation, in the primary transformation data storage unit 104. The processing then returns to the calling-source processing.

Figure 15:
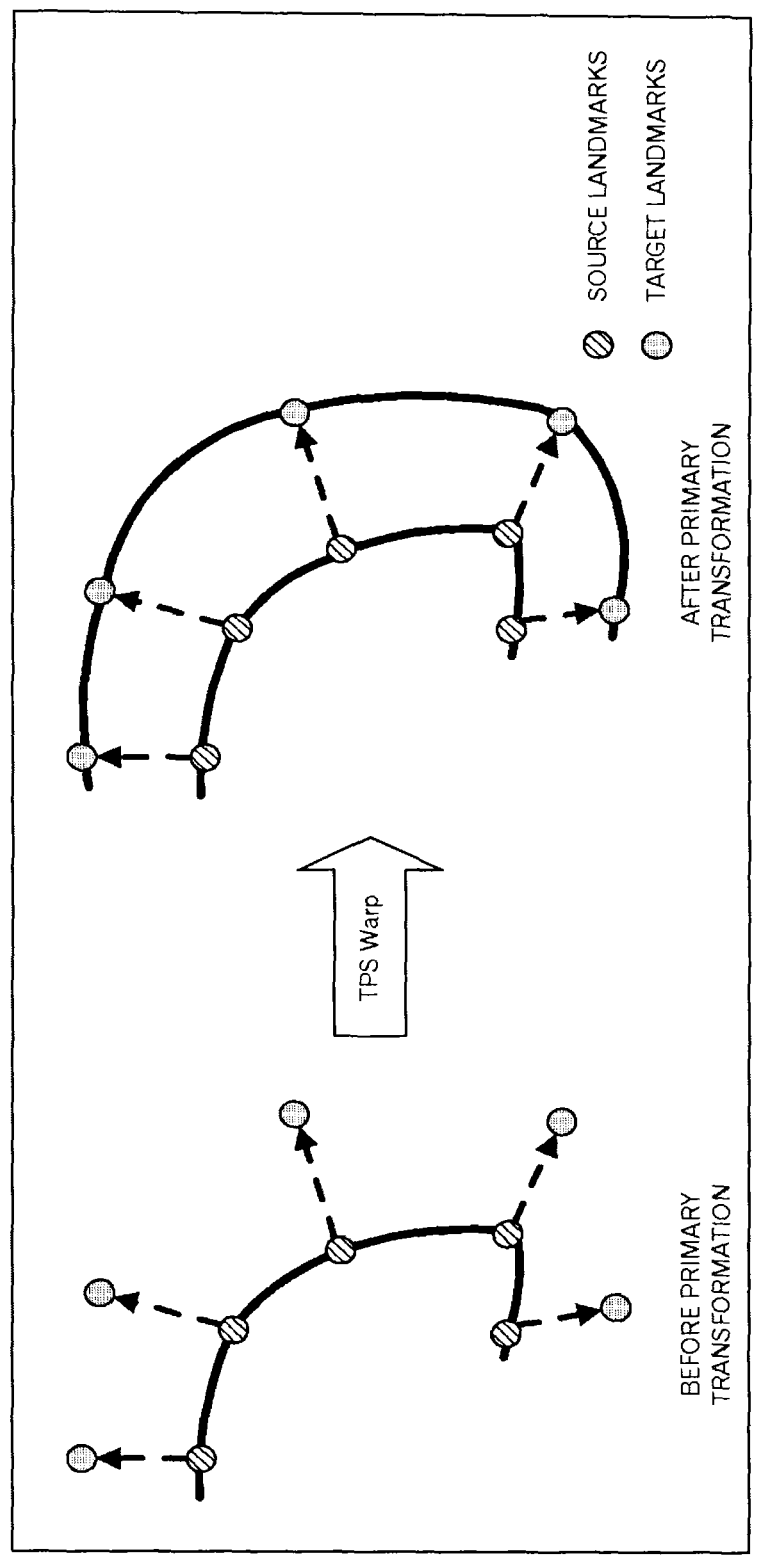
FIG. 15 is a diagram to explain TPS Warp.

Here, the TPS Warp method will be explained. As illustrated in FIG. 15, in TPS Warp, when the source landmarks and the target landmarks that correspond to the source landmarks are given, the transformation is performed so that the source landmarks lay on the corresponding target landmarks. For details on the TPS Warp, refer to Fred L. Bookstein, "Principal Warps: Thin-Plate Splines and the Decomposition of Deformations", IEEE TRANSACTIONS ON PATTERN ANALYSIS AND MACHINE INTELLIGENCE, VOL. 11 NO. 6, PP. 567-585, June 1989, for example. This document is incorporated into this specification by reference.

The format of the data stored in the primary transformation data storage unit 104 is the same as the format of the data that is stored in the reference shape data storage unit 101. Moreover, the source landmarks that were used in the primary transformation processing (namely, points overlap with the target landmarks in the primary transformation processing) are handled as fixed points in the secondary transformation processing. In other words, the source landmarks that were used in the primary transformation processing do not move in the secondary transformation processing, and the positions are kept the same.

Figure 16:
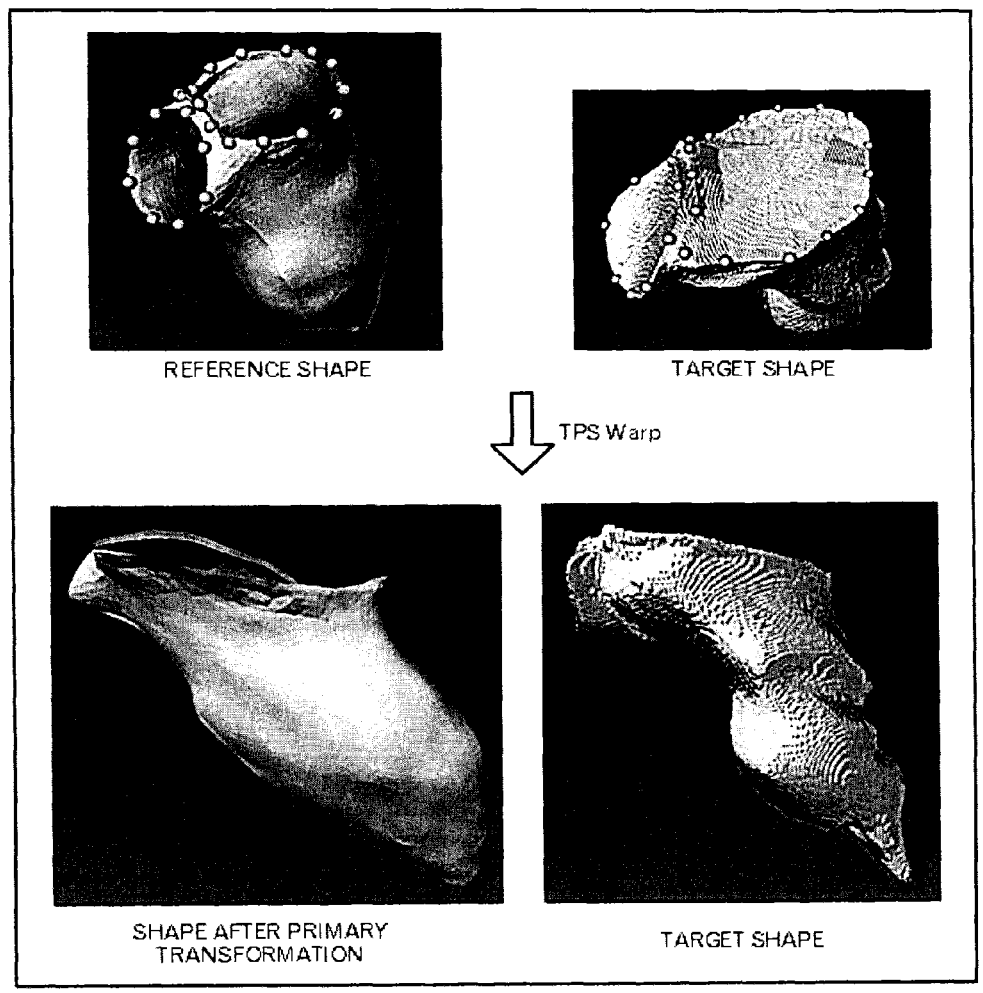
FIG. 16 is a diagram depicting an example that the primary transformation processing is applied to a left ventricle.

FIG. 16 illustrates an example of applying the primary transformation processing described above to the left ventricle. An object in the upper left part represents the reference shape with the source landmarks (circles), and an object in the upper right part represents the target shape with the target landmarks (circles). An object in the lower left part represents a shape after the primary transformation, which is the result of the TPS Warp using the reference shape and the target shape. An object in the lower right part represents the target shape observed from a different viewpoint.

Figure 17:
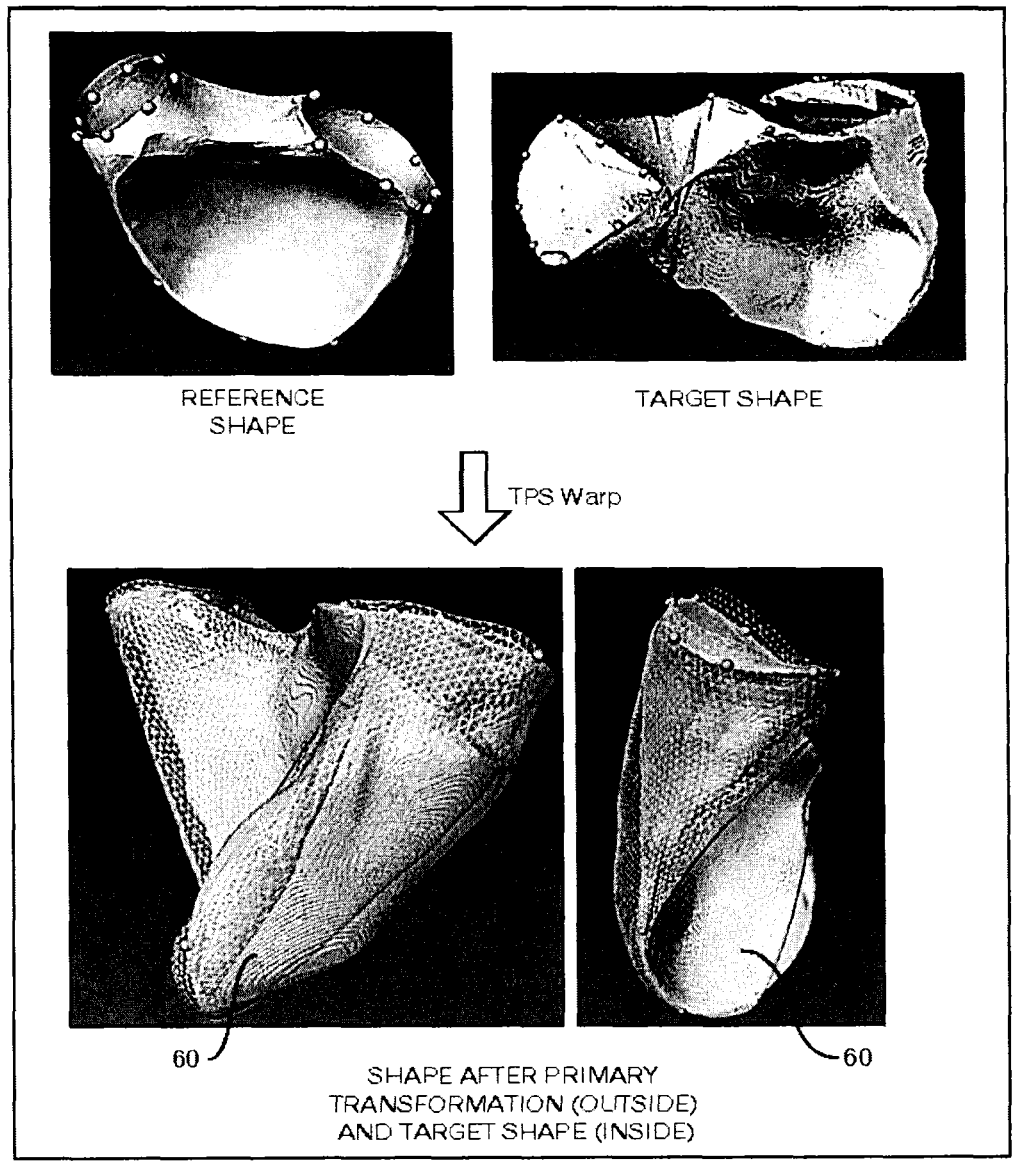
FIG. 17 is a diagram depicting an example that the primary transformation processing is applied to a right ventricle.

FIG. 17 illustrates an example of applying the primary transformation processing described above to the right ventricle. An object in the upper left part represents the reference shape with the source landmarks (circles), and an object in the upper right part represents the target shape with the target landmarks (circles). Meshed lines 60 represent a shape after the primary transformation, which is the result of the TPS Warp using the reference shape and the target shape. In the lower part, the shape after the primary transformation, which is illustrated by the meshed lines 60, is superimposed on the target shape in order to easily compare.

As described above, by performing the rough alignment in advance according to the setting of the landmark settings, which are accepted from the user, it becomes possible to more effectively perform the detailed transformation that will be performed later.

Returning to the explanation of FIG. 13, the secondary transformation unit 107 performs a secondary transformation processing (step S115). The secondary transformation processing will be explained using FIGS. 18 to 27.

Figure 18:
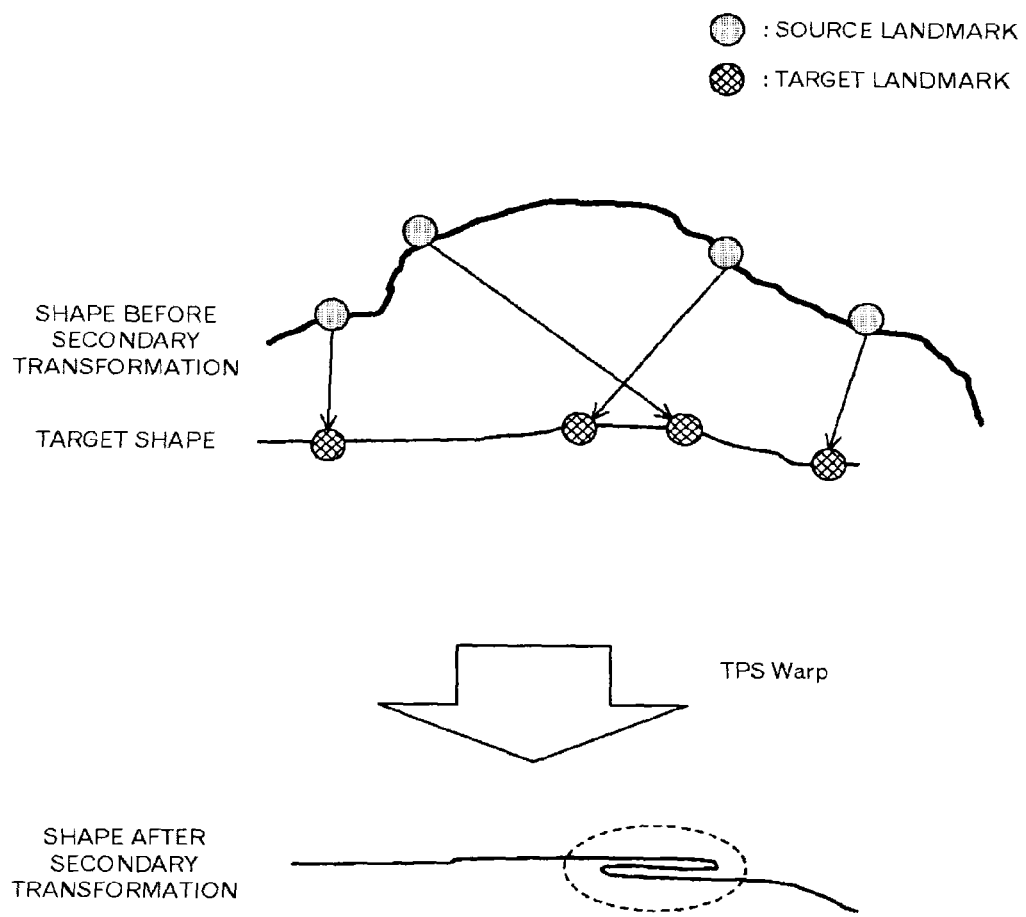
FIG. 18 is a diagram to explain a problem in case where target landmarks are placed on a target shape.

First, a summary of the secondary transformation processing will be given. In case where the transformation processing is performed according to the TPS Warp method, when considering that typically the heart has a rounded shape, setting the target landmarks on the normal lines of the source landmarks is thought to be effective. For example, as illustrated in FIG. 18, it is considered that the transformation processing based on the TPS Warp method is performed by placing the source landmarks on the shape before the transformation (i.e. shape after the primary transformation), and placing the target landmarks at the intersecting points between normal lines of the source landmarks and the target shape. However, when such a situation occurs that the normal lines cross as illustrated in FIG. 18, an unnatural portion that differs from the target shape may occur in the shape after the transformation.

Figure 19:
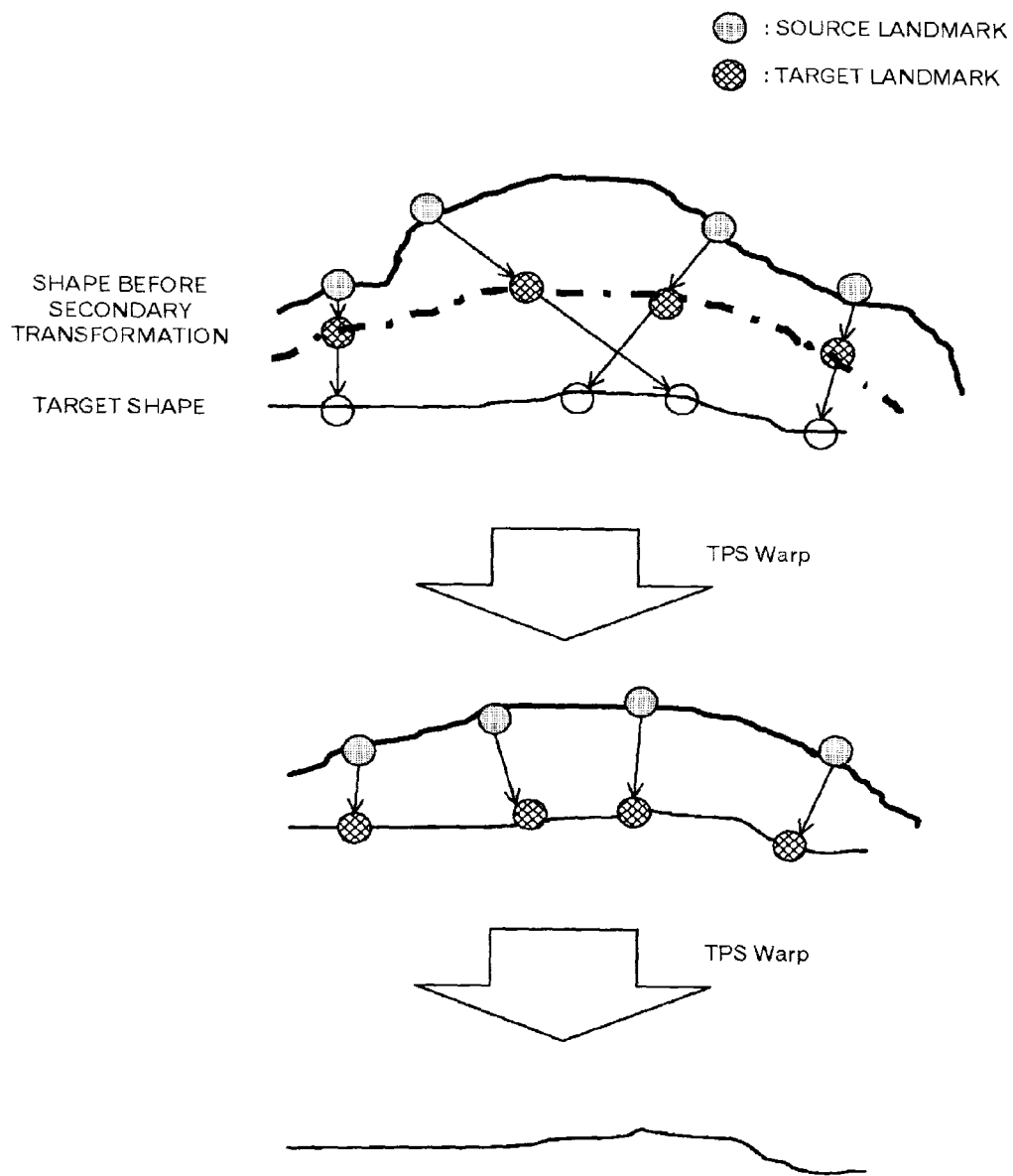
FIG. 19 is a diagram to explain an outline of a secondary transformation processing.

Therefore, in the secondary transformation processing in this embodiment, as illustrated in FIG. 19, the target landmarks are placed at points that internally divide the line segments that connect the source landmarks, which are placed on the shape before the transformation (i.e. shape after the primary transformation), with the aforementioned intersecting points, and then the transformation processing is carried out according to the TPS Warp method. Furthermore, by repeating such a transformation processing, the shape gradually approaches the target shape. In this way, an unnatural portion dose not easily occur in the shape after the transformation, and it becomes easier that the direction of the normal lines faces toward the portion that should be originally target.

Figure 20:
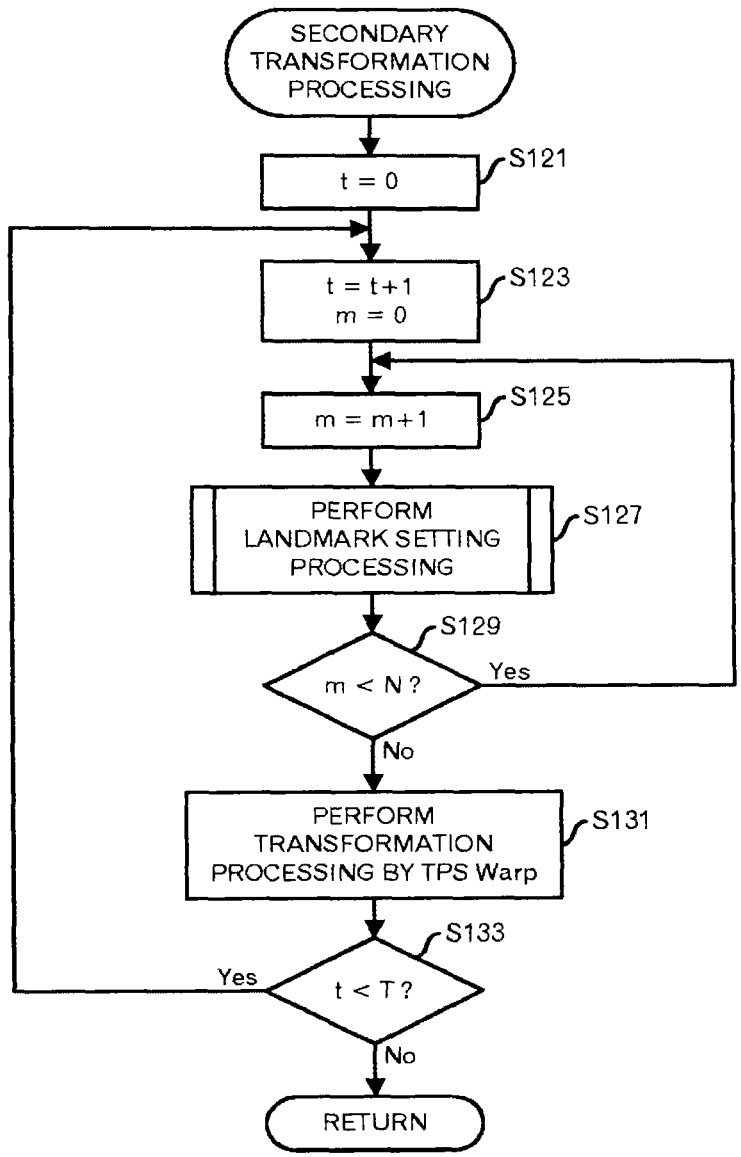
FIG. 20 is a diagram depicting a processing flow of the secondary transformation processing.

The secondary transformation processing will be explained in detail using FIGS. 20 to 27. First, the secondary transformation unit 107 sets the initial value of a variable t for counting the number of times of the transformations as t=0 (FIG. 20: step S121). Next, the secondary transformation unit 107 counts the number of times of the transformations by incrementing the variable t such that t=t+1, and sets the initial value of a variable m as m=0 (step S123). Here, m is a variable for counting the number of vertices that were processed.

The secondary transformation unit 107 then increases the variable m so that m=m+1 (step S125), and instructs the landmark processing unit 106 to perform the landmark setting processing. Then, the landmark processing unit 106 performs the landmark setting processing (step S127). The landmark setting processing will be explained using FIGS. 21 to 27.

Figure 21:
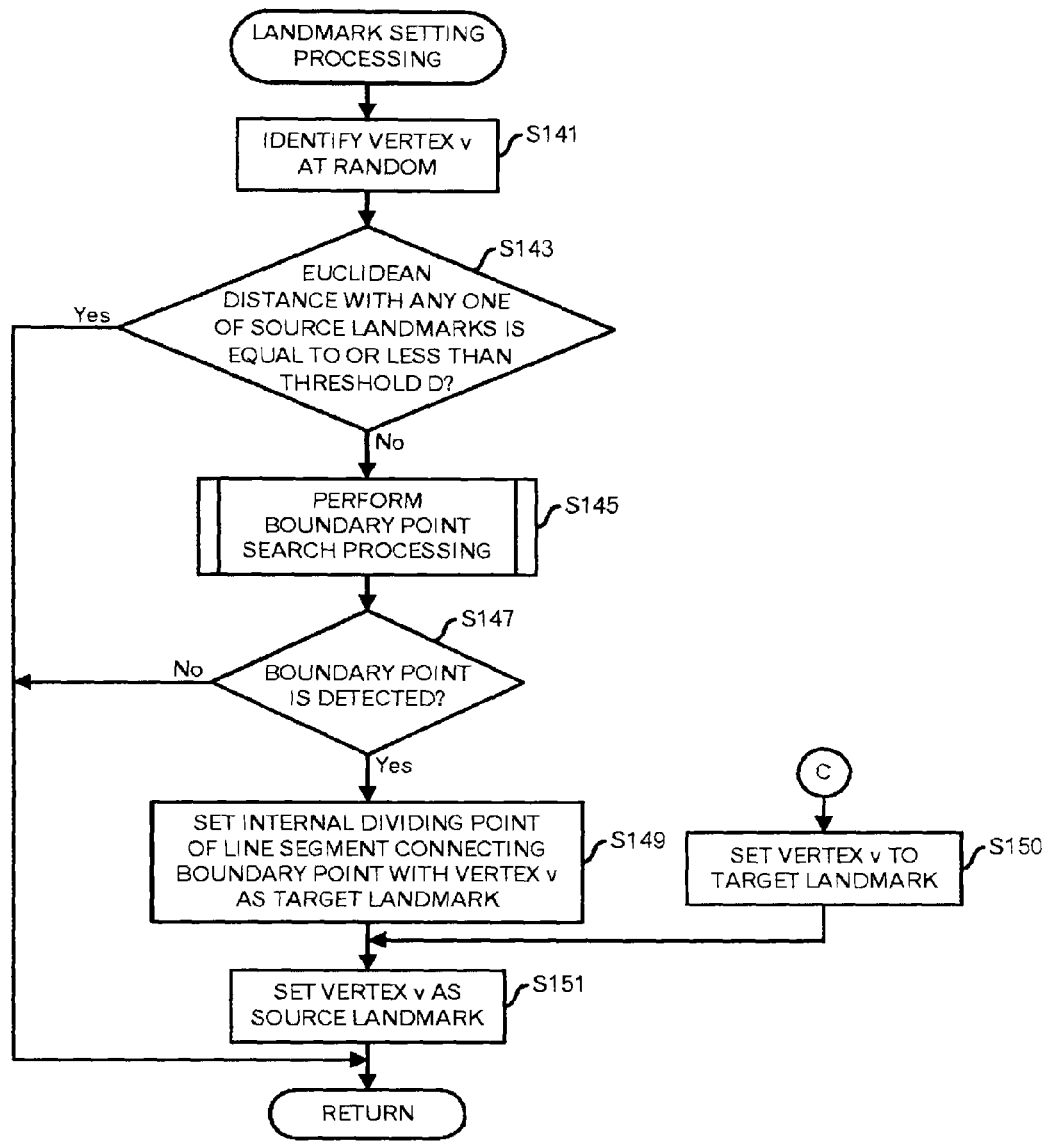
FIG. 21 is a diagram depicting a processing flow of a landmark setting processing.

First, the setting unit 108 of the landmark processing unit 106 identifies one vertex "v" at random front data stored in the post-transformation data storage unit 115 or data stored in the primary transformation data storage unit 109 (FIG. 21: step S141). In the step S141, the setting unit 108 identifies one vertex "v" from data stored in the post-transformation data storage unit 115 when data is stored in the post-transformation data storage unit 115 (in other words, the transformation processing is performed at least one time in the secondary transformation processing). The setting unit 108 identifies one vertex "v" from data stored in the primary trans formation data storage unit 104 when data is not stored in the post-transformation data storage unit 115.

Then, the setting unit 108 uses the data of the source landmarks moved in the primary transformation processing and the data of the source landmarks that are stored in the second landmark data storage unit 110 to calculate the Euclidean distances between the vertex "v" and the respective source landmarks. Initially, the second landmark data storage unit 110 sometimes stores no data. In this case, data of the source landmarks stored in the first landmark data storage unit 105 are used to calculate the distance. The setting unit 108 then determines whether the minimum distance of the Euclidean distances between the vertex "v" and the respective source landmarks is equal to or less than a threshold value D (step S143). The step S143 is performed in order to uniformly place the vertex "v" on the shape before the secondary transformation processing. At the step S143, whether or not a following equation is satisfied is determined.

$$\min_i d(v, v_i) \le D$$

Here, d(v, $v_i$) indicates the Euclidean distance between the point "v" and the point "$v_i$". The point "$v_i$" is a fixed point (or in other words, a source land mark moved in the primary transformation processing), or is a source landmark (a vertex whose data is stored in the second landmark data storage unit 110).

When it is determined that the minimum of the Euclidean distances between the vertex "v" and the respective source landmarks is equal to or less than the threshold value D (step S143: Yes route), the processing returns to the calling-source processing. On the other hand, when it is determined that the minimum of the Euclidean distances between the vertex "v" and the respective source landmarks is greater than the threshold value D (step S143: NO route), the setting unit 108 instructs the boundary point search unit 109 to carry out a boundary point search processing. Then, the boundary point search unit 109 carries out the boundary point search processing (step S145). The boundary point search processing will be explained using FIGS. 22 to 27.

Figure 22:
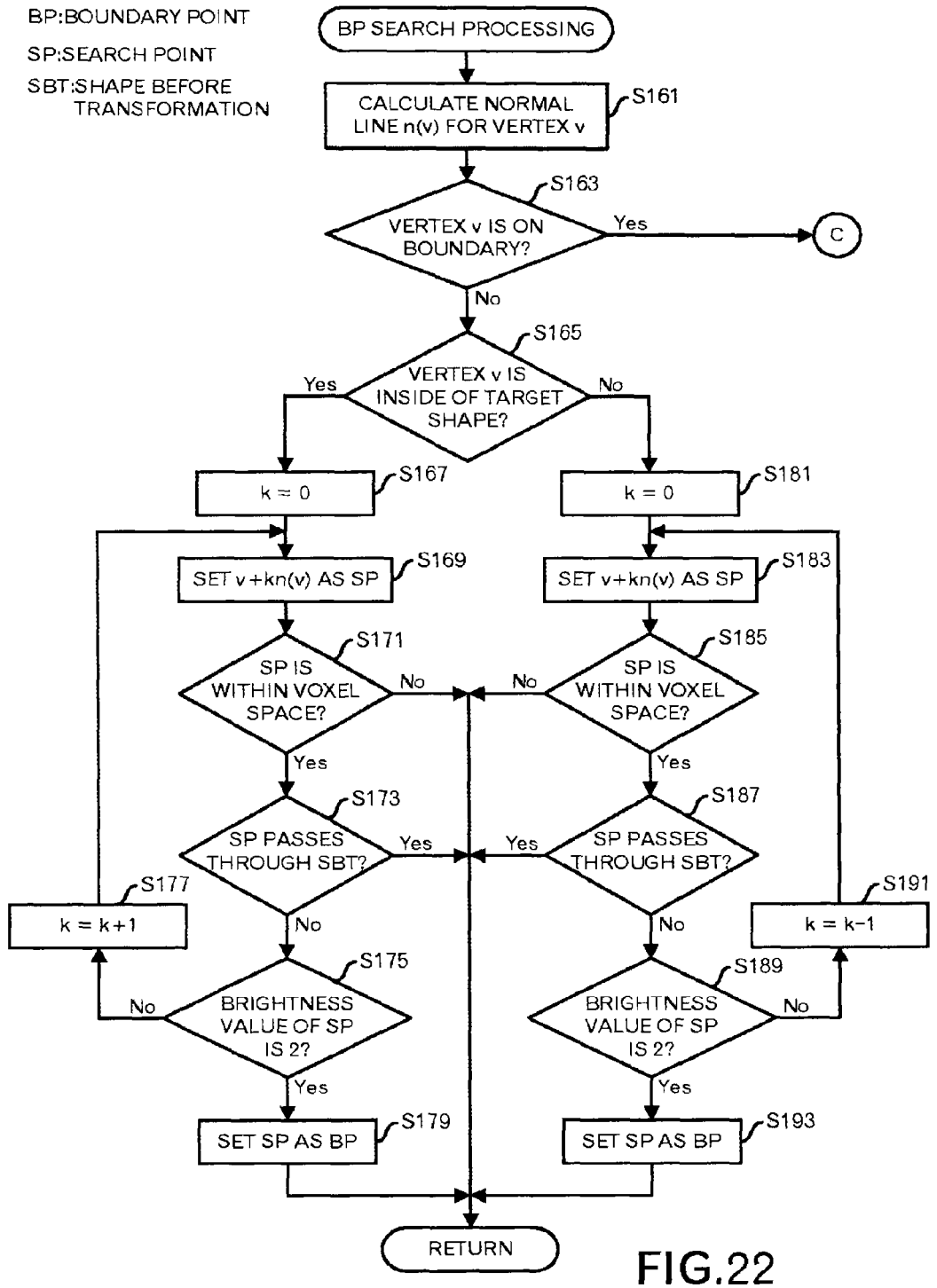
FIG. 22 is a diagram depicting a processing flow of a boundary point search processing.

First, the boundary point search unit 109 calculates the unit normal vector n(v) (FIG. 22: step S161). Here, n(v) is the normal unit vector with respect to the surface H at the vertex v(∈H). The unit normal vector is a normal vector with the length "1". H ($\subset$ V) is a shape surface that is specified by data stored in the primary transformation data storage unit 104 or data stored in the post-transformation data storage unit 115, and V($\subset R^3$) is a voxel space that is specified by the 3-dimensional shape data of the target shape. Moreover, $R^3$ represents a real number space.

The boundary point search unit 109 also determines whether or not the vertex "v" exists on a boundary (step S163). At the step S163, it is determined whether or not the following equation is satisfied.

$$f(v)=2$$

Here, mapping from the voxel space V to the real number space R (f: V–>R) is defined as follows. According to this mapping f, the elements of 3-dimensional shape data of the target shape, which are included in the voxel space V, are correlated with the real number space R.

$$f(p)=I$$

Here, I is the brightness value of a voxel that includes a point p(∈V).

When it is determined that the vertex "v" exists on the boundary (step S163: Yes route), the processing shifts to the step S150 in FIG. 21 through terminal C. Then, the setting unit 108 sets the vertex "v" as a target landmark (step S150). The setting unit 108 sets the vertex "v" as a source landmark (step S151). Furthermore, the setting unit 108 adds a set of data of the set target landmark and data of the set source landmark to the second landmark data storage unit 110.

By doing the processing aforementioned above, the vertex "v" does not move when the vertex "v" exists on the boundary. Therefore, the boundary between the heart and the non-heart is simulated with high accuracy.

On the other hand, when the vertex "v" does not exist on the boundary (step S163: No route), the boundary point search unit 109 determines whether the vertex "v" exists inside the target shape (step S165). At the step S165, it is determined whether or not the following equation is satisfied.

$$f(v)=1$$

Figure 23:
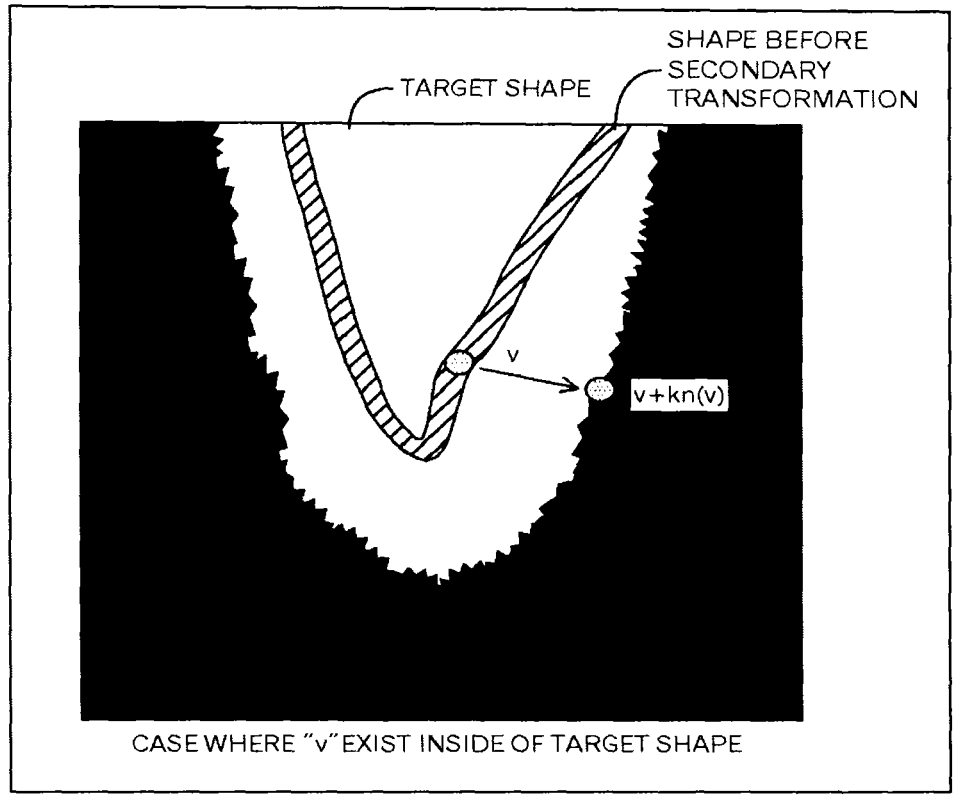
FIG. 23 is a diagram depicting a relationship between a position of a vertex "v" and a brightness value.
Figure 24:
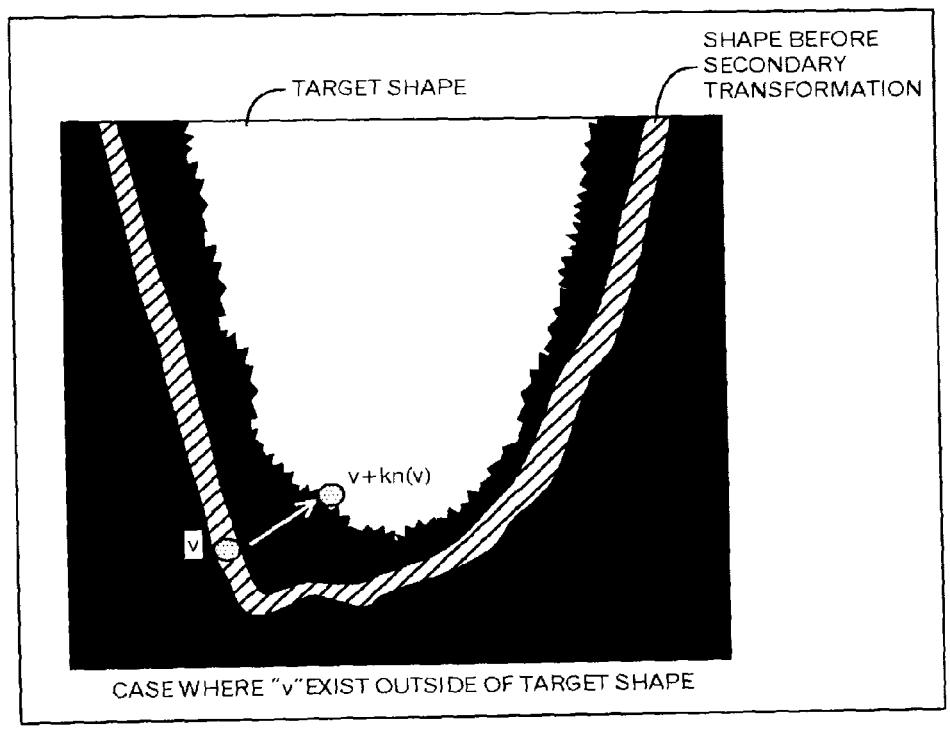
FIG. 24 is a diagram depicting the relationship between the position of the vertex "v" and the brightness value.

The processing at the step S165 will be explained using FIGS. 23 and 24. As illustrated in FIG. 23, when the brightness value f(v) in the voxel space, which corresponds to the vertex "v", is equal to 1, the vertex "v" is located on the inside of the target shape. Therefore, by setting a coefficient k in the processing at step S177, which will be described later, so as to be incremented by "1" at a time, the boundary point is searched for in the direction going toward the outside from the inside of the target shape. On the other hand, as illustrated in FIG. 24, when the brightness value f(v) in the voxel space, which corresponds to the vertex "v" becomes 0, the vertex "v" is located on the outside of the target shape. Therefore, by setting the coefficient k in the processing at step S191, which will be described later, so as to be decremented by "1" at a time, the boundary point is searched for in the direction going toward the inside from outside the target shape.

Returning to the explanation of FIG. 22, when it is determined that the vertex "v" exists on the inside of the target shape (step S165: Yes route), the boundary point search unit 109 sets the coefficient k as k=0 (step S167). In addition, the boundary point search unit 109 sets a point (hereafter referred to as a search point) for which a determination will be made as to whether or not the point is a boundary point as described below (step S169).

$$v+kn(v)$$

The boundary point search unit 109 then determines whether or not the search point exists inside the voxel space specified by the 3-dimensional shape data of the target shape (step S171). At the step S171, it is determined whether or not the following equation is satisfied.

$$v+kn(v)\in V$$

When it is determined that the search point does not exist inside the voxel space specified by the 3-dimensional shape data of the target shape (step S171: NO route), the processing returns to the calling-source processing. This is because the search point has reached outside the voxel space, so it is possible to determine that the normal line for the vertex "v" does not cross the target shape.

On the other hand, when it is determined that the search point exists inside the voxel space that is specified by the 3-dimensional shape data of the target shape (step S171: Yes route), the boundary point search unit 109 determines whether or not the search point passed through the shape before the transformation (step S173). At the step S173, it is determined whether or not the following equation is satisfied.

$$g(v),g(v+kn(v)))<0$$

Here, mapping g: V–>$R^3$ is defined as follows. This mapping g correlates the elements of the segment image data that is included in the voxel space V with the real number space $R^3$.

$$g(p) = \begin{cases} n(p) & (\text{if } p \in H) \\ 0 & (\text{if } p \notin H) \end{cases}$$

Be aware that the limit $g|_H$ of the mapping g becomes n(v).

Figure 25:
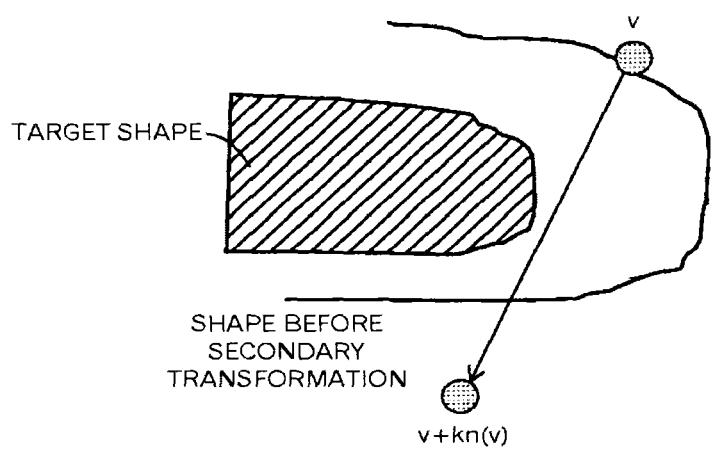
FIG. 25 is a diagram depicting an example of a case where the search point passes through a shape before the transformation.
Figure 26:
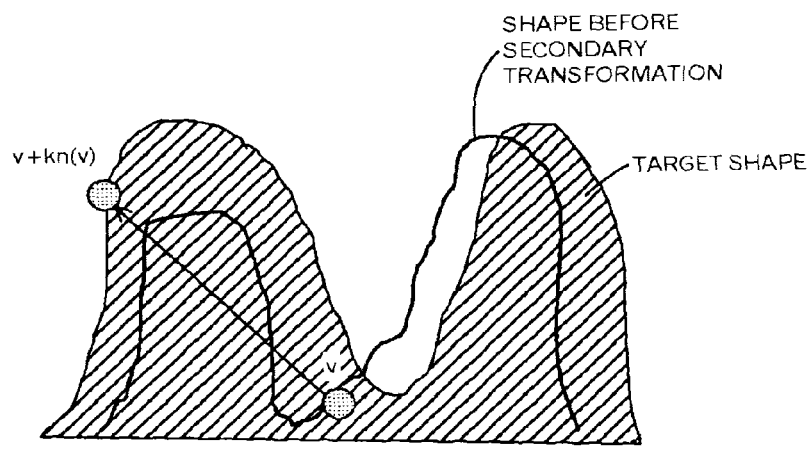
FIG. 26 is a diagram depicting an example of a case where the search point passes through the shape before the transformation.

The processing of the step S173 will be explained using FIGS. 25 and 26. When the search point passes through the shape before the transformation before reaching the boundary point, there is a possibility that searching for the boundary point is not carried out properly. For example, the case where the search point passes through the shape before the transformation before reaching the boundary point may be the case illustrated in FIG. 25 or the case illustrated in FIG. 26. In other words, there is a case where the boundary point does not exist in the search direction according to the extent of the transformation of the target shape with respect to the shape before the transformation. In any case, there is a possibility that the boundary point is not detected, or that the boundary point is detected at a location that is not suitable. Therefore, at the step S173, the inner product of the normal vector for the vertex "v" and the normal vector for the search point is calculated, and when the inner product is less than 0 (in other words, when the angle between normal vectors is greater than 90 degrees), the search point is determined to have passed through the shape before the transformation.

Returning to the explanation of FIG. 22, when it is determined that the search point passed through the shape before the transformation (step S173: Yes route) it is not possible to detect a suitable boundary point, so the processing returns to the calling-source processing. On the other hand, when it is determined that the search point does not pass through the shape before the transformation (step S173: NO route), the boundary point search unit 109 determines whether the brightness value in the voxel space, which corresponds to the search point, is "2" (step S175).

When the brightness value of the search point is not "2" (step S175: No route), the boundary point search unit 109 increments the coefficient k by "1" (step S177), then the processing returns to the processing of the step S169.

Figure 27:
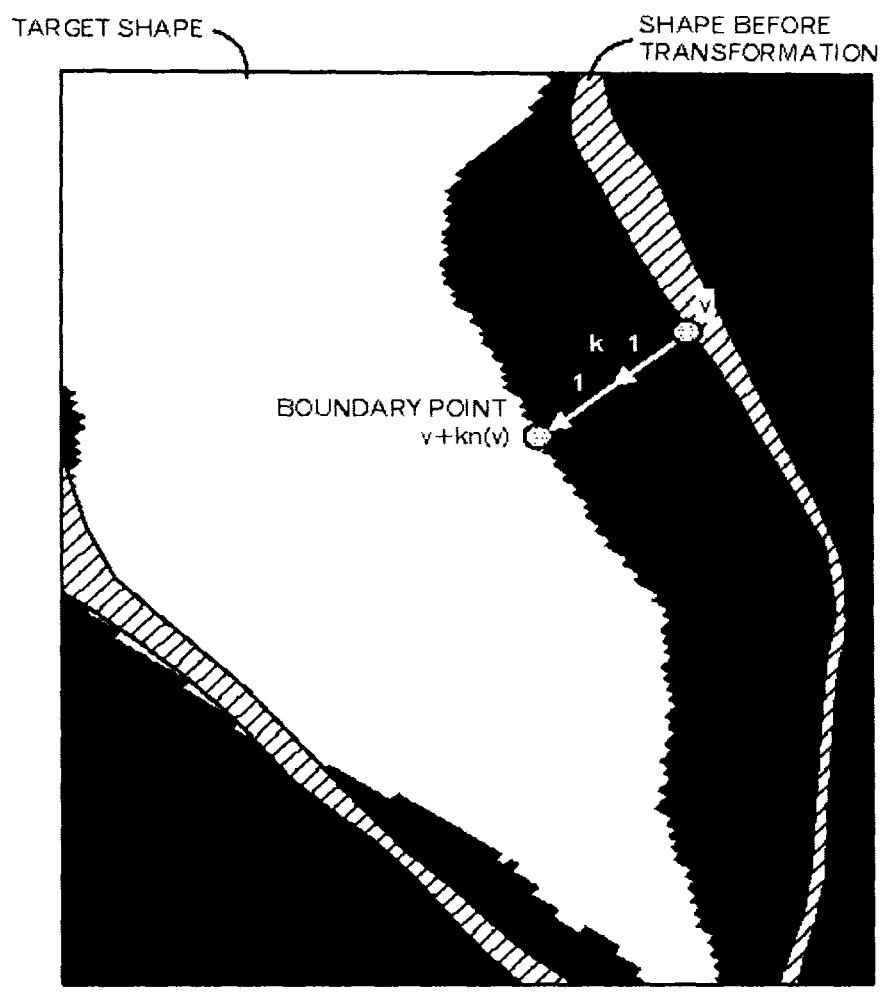
FIG. 27 is a diagram to explain a search method of the boundary point.

In this way, as illustrated in FIG. 27, it is possible to determine whether or not the search point is on the boundary while moving the search point one voxel at a time in the normal direction from the vertex "v".

On the other hand, when the brightness value is "2" (step S175: Yes route), the boundary point search unit 109 sets the search point as the boundary point (step S179). At the step S179, data of the search point (for example, the value of k) is stored in a storage device such as a main memory. Then the processing returns to the calling-source processing.

In regards to this, the processing that is performed at the step S165 when it is determined that the vertex "v" is located on the outside of the target shape (step S165: NO route) will be explained. The processing in this case differs only in the direction of the search, so the contents of the basic processing are as described above. In other words, the processing of the step S181 is the same as the processing of the step S167, the processing of the step S183 is the same as the processing of the step S169, the processing of the step S185 is the same as the processing of the step S171, the processing of the step S187 is the same as the processing of the step S173, and the processing of the step S189 is the same as the processing of the step S175. Therefore, detailed explanations of the processing from steps S181 to step S189 are omitted.

Then, at the step S191, the boundary point search unit 109 decrements the coefficient k as k=k−1 (step S191), and the processing returns to the processing of the step S183. As a result, the search point is moved one voxel at a time in the normal direction from the outside of the target shape toward the inside. In addition, the processing of the step S193 is the same as the processing of the step S179.

By performing the processing such as described above, it becomes possible to detect the crossing point between the target shape and the normal line with respect to the vertex "v" as the boundary point, whose brightness value is "2".

Returning to the explanation of FIG. 21, the setting unit 108 determines whether a boundary point was not detected by the boundary point search unit 109 (step S147). When it is determined that a boundary point was not detected by the boundary point search unit 109 (step S147: NO route), the processing returns to the calling-source processing in order to perform a processing for the next vertex.

On the other hand, when it is determined that a boundary point was detected (step S147: Yes route), the setting unit 108 sets an internal dividing point on the line segment that connects the vertex "v" and the boundary point "v+kn(v)" as a target landmark (step S149). More specifically, a point as described below is set as the target landmark.

$$v + \frac{t}{T} kn(v)$$

Then, the setting unit 108 sets the vertex "v" as a source landmark (step S151). The setting unit 108 stores the data for the set of source landmark and the target landmark in the second landmark data storage unit 110. Then, the processing returns to the calling-source processing.

By performing the processing such as described above, it is possible to set an internal dividing point on the line segment that connects a vertex in the shape before the transformation and a boundary point in the target shape as a target landmark. In addition, it is possible to simulate a boundary in the segment image data and generate the other portion so as to become a typical shape that is similar to the reference shape, because only a portion that is on the boundary in the segment image data is set as the target landmark. As a result, it becomes 3-dimensional shape data with high accuracy.

Returning to the explanation of FIG. 20, the secondary transformation unit 107 determines whether or not m<N is satisfied for the variable m (step S129). Here, N is the total number of vertices in the shape after the primary transformation (or the shape after transforming the shape after the primary transformation). When it is determined that m<N is satisfied (step S129: Yes route), the processing returns to the processing of the step S125 in order to perform the processing for the next vertex.

On the other hand, when it is determined m<N is not satisfied for the variable m (step S129: NO route) the secondary transformation unit 107 performs the transformation based on the TPS Warp according to the data for the source landmarks and target landmarks that are stored in the second landmark data storage unit 110, and stores the data for the transformed shape in the post-transformation data storage unit 115 (step S131). If a result of transformation processing in the previous time is stored in the post-transformation data storage unit 115, the result is overwritten with the data for the transformed shape.

As described above, in the transformation processing at the step S131, a point that was a source landmark in the primary transformation processing is handled as a fixed point and is not moved. Then, the secondary transformation unit 107 deletes the data of the source landmark and the target landmark, which are stored in the second landmark data storage unit 110.

The secondary transformation unit 107 then determines whether t<T is satisfied for variable t (step S133). When it is determined that t<T is satisfied (step S133: Yes route), the processing returns to the processing of the step S123 in order to perform further transformation processing. Here, T is the total number of times of the transformation, and may be set beforehand by an administrator or the like (for example, T=500).

On the other hand, when it is determined t<T is not satisfied for variable t (step S133: NO route), the transformation has been performed T times, so the secondary transformation unit 107 stores the data for the shape after the secondary transformation processing in the secondary transformation data storage unit 111, and the processing returns to the calling-source processing.

By performing the processing such as described above, the shape after the primary transformation approaches the target shape, and it becomes possible to obtain 3-dimensional shape data having high precision. Moreover, with such a kind of transformation method, the processing time becomes comparatively short.

Returning to the explanation of FIG. 13, after the secondary transformation processing has been performed, the display unit 112 displays the data stored in the secondary transformation data storage unit 111 on the display device or the like (step S117). The processing then ends.

Figure 28:
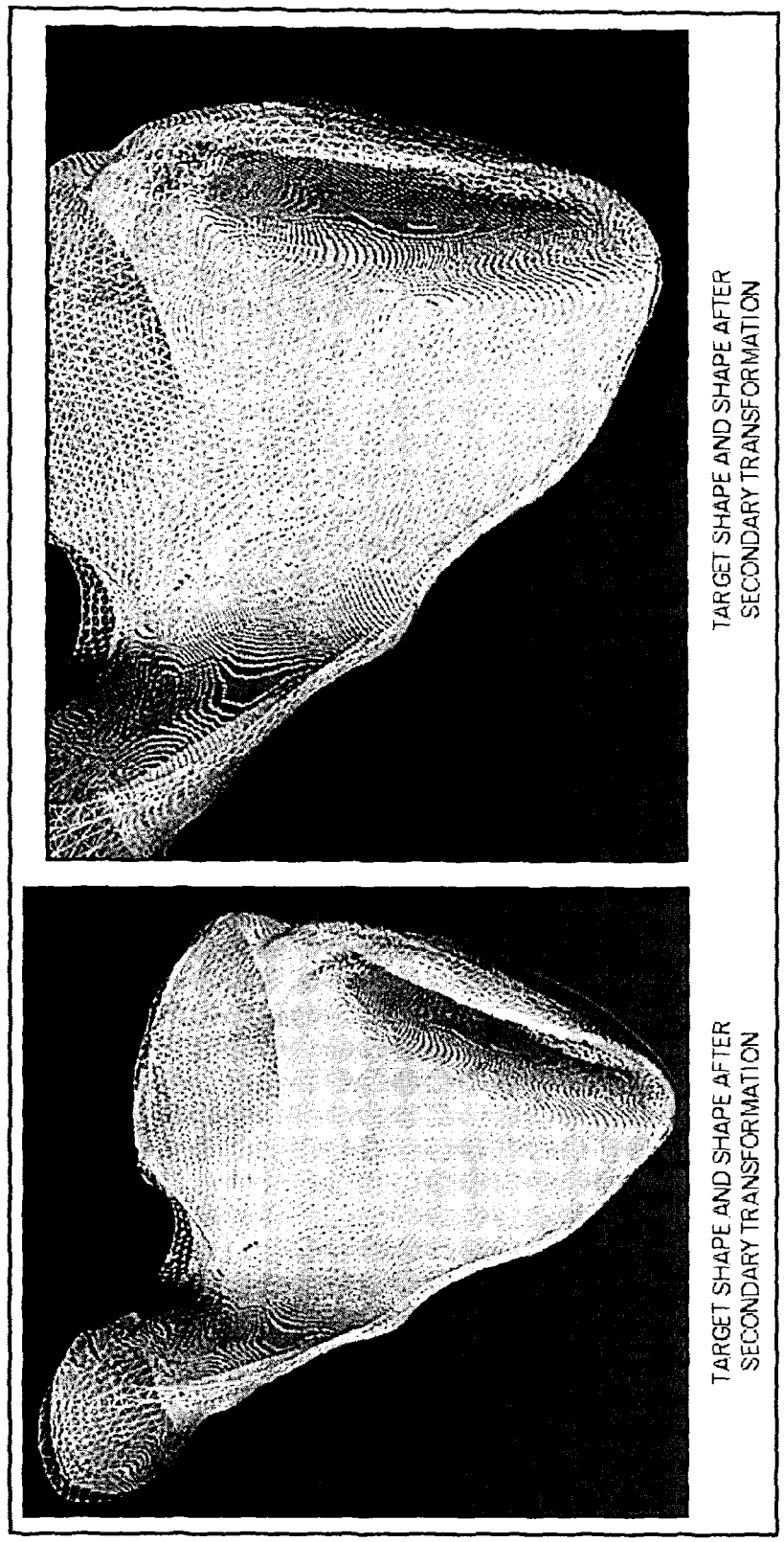
FIG. 28 is a diagram depicting a shape after the secondary transformation and the target shape.

FIG. 28 illustrates an example of data that is displayed on the display device or the like. In the example in FIG. 28, the target shape and the shape after the secondary transformation, which is indicated by mesh lines, are displayed. The figure on the left side is a figure illustrating the entire transformed portion, and the figure on the right side is an enlarged view of part of the transformed portion.

Figure 29:
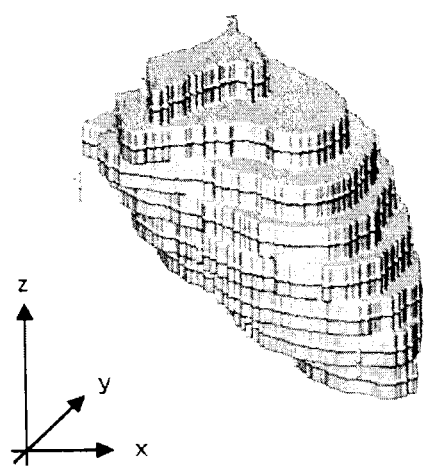
FIG. 29 is a diagram depicting 3-dimensional data of the target shape obtained when processings of this embodiment are not executed.
Figure 30:
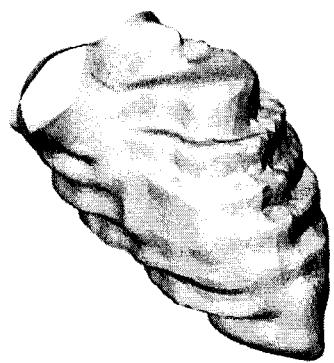
FIG. 30 is a diagram depicting final 3-dimensional data obtained when processings of this embodiment are not executed.

Incidentally, when the number of the segment images is little and slice intervals are long, 3-dimensional shape data of the target shape illustrated in FIG. 29 are generated unless processings in this embodiment are performed. Voxels are elongate in the z-axis direction in this 3-dimensional shape data. When the transformation processing is performed using this 3-dimensional shape data of the target shape, 3-dimensional shape data illustrated in FIG. 30 is generated. As illustrated in FIG. 30, concavity and convexity which do not exist in a real heart occur.

Figure 31:
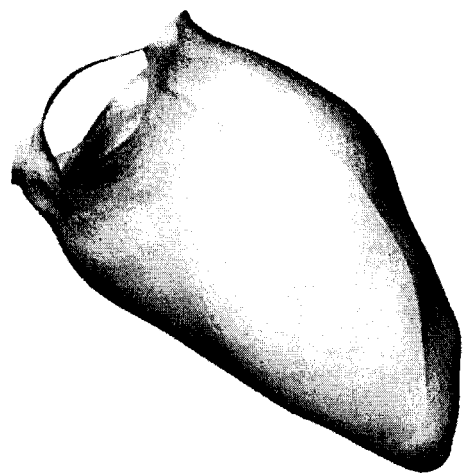
FIG. 31 is a diagram depicting final 3-dimensional data obtained when processings of this embodiment are executed.

On the other hand, even though the number of the segment images is little and slice intervals are long, 3-dimensional shape data of the target shape has no concavity or convexity and becomes smooth as illustrated in FIG. 31 when processings in this embodiment are performed.

Figure 32:
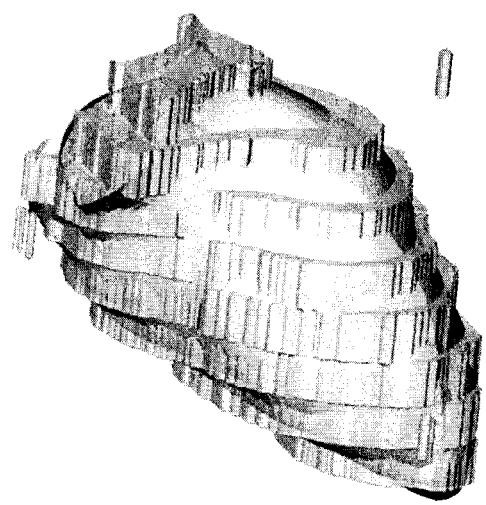
FIG. 32 is a diagram depicting the shape after the secondary transformation processing, being superimposed on the target shape.

FIG. 32 illustrates a shape after the secondary transformation processing illustrated in FIG. 31, which is superimposed on the target shape illustrated in FIG. 12. Voxels in the target shape, which have a brightness value "2" (in other words, voxels on a boundary in the segment image data), correspond to a boundary of a shape after the secondary transformation processing.

Figure 33:
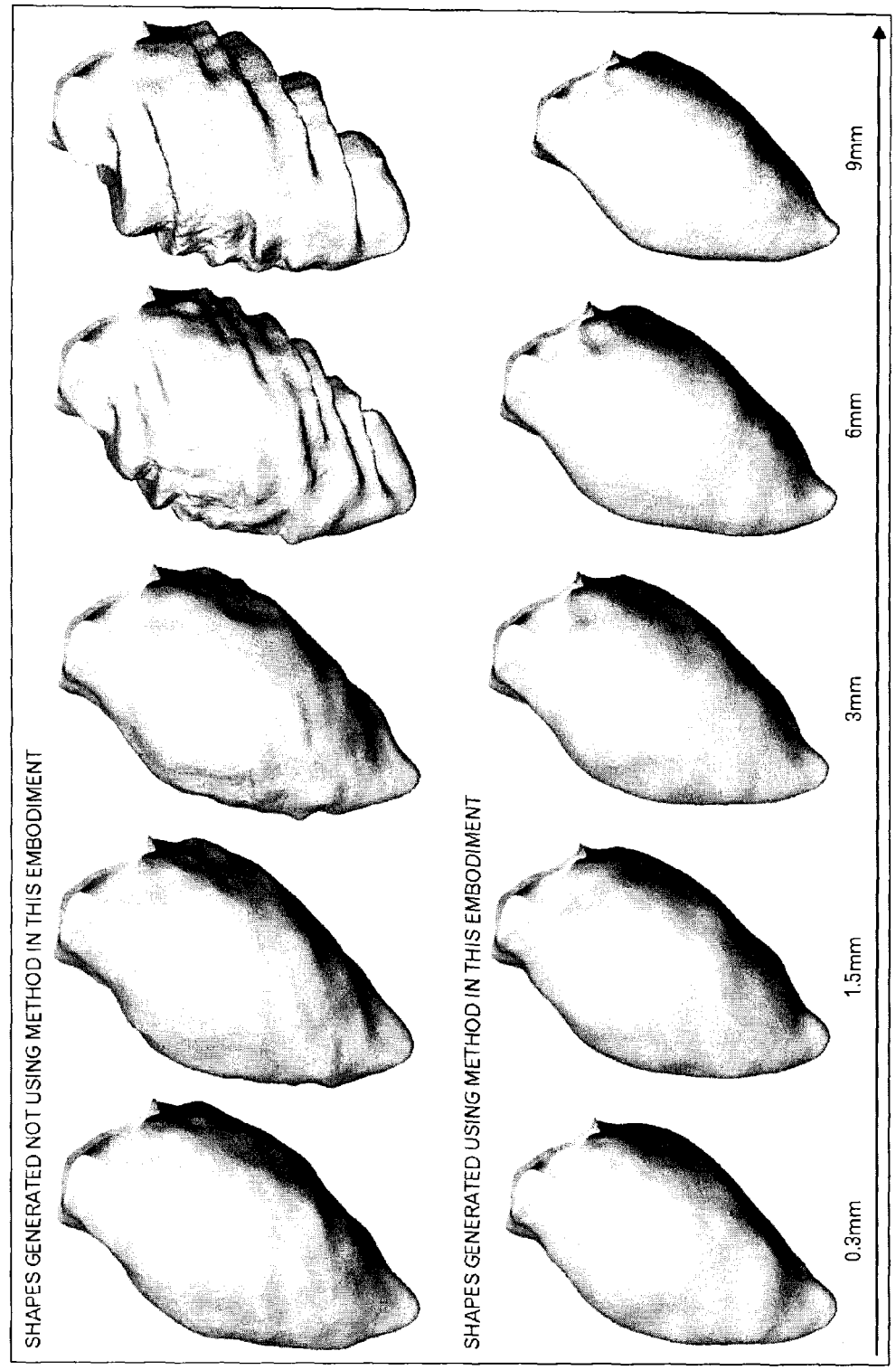
FIG. 33 is a diagram depicting final 3-dimensional data obtained when processings of this embodiment are not executed and final 3-dimensional data obtained when processings of this embodiment are executed.

FIG. 33 illustrates 3-dimensional shape data obtained when the method of this embodiment is not used (in other words, when the processings of the steps from S1 to S7 are not performed) and 3-dimensional shape data obtained when the method of this embodiment is used side by side. In FIG. 33, slice intervals becomes longer (in other words, the number of the segment images becomes less) from left to right. When the method of this embodiment is not used, the longer slice intervals become, the more concavity and convexity that do not exist in a real heart occur. On the other hand, when the method of this embodiment is used, even though slice intervals become longer, a smooth shape with no concavity and convexity is maintained.

Although the embodiment of this technique was explained above, this technique is not limited to this embodiment. For example, the functional block diagram of the shape data generation apparatus 1 explained above does not necessarily have to correspond to an actual program module configuration.

Moreover, in the processing flow explained above, the order of steps may be changed as long as the processing results do not change. Furthermore, as long as the processing results do not change, the steps may be executed in parallel.

In the example described above, the segment image data is displayed on the landmark setting screen to set the target landmarks. However, for example, tomographic images such as CT images may be displayed to set the target landmarks.

The processing such as described above is not only applicable to the heart, but can also be applied to other objects.

Figure 34:
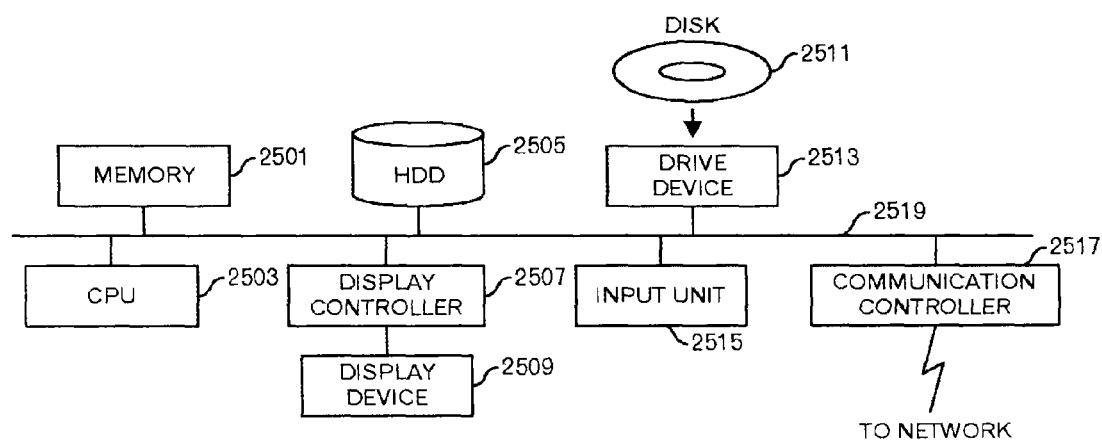
FIG. 34 is a functional block diagram of a computer.

In addition, the aforementioned the shape data generation apparatus 1 is a computer device as illustrated in FIG. 34. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 34. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiment is summarized as follows:

A shape data generation method includes; (A) generating data of a target shape of transformation from plural tomographic images of an object; (B) first specifying, from among plural vertices of a first shape that is a reference shape of the object and is to be transformed, plural first vertices, each first vertex of which satisfies a condition that a normal line of the first vertex passes through a certain point that is located on the target shape and is located on a boundary of the object in anyone of the plural tomographic images; second specifying, for each of the plural first vertices, a second vertex that internally divides a segment between the first vertex and the certain point; (C) transforming the first shape so as to put each of the plural first vertices on a corresponding second vertex; (D) setting a shape after the transforming to the first shape; and (E) executing the first specifying, the second specifying, the transforming and the setting a predetermined number of times.

By doing the aforementioned processing, it becomes possible to transform the reference shape so as to match to the boundary in the tomographic images, and to generate the other portion so as to approach the reference shape of the object. In addition, by trans forming gradually, an unnatural shape is unlikely to occur in a shape after the transformation. Therefore, it becomes possible to generate 3-dimensional shape data with high accuracy when sufficient tomographic images are not obtained.

Moreover, the generating may include: (a1) setting a brightness value of the certain point to a predetermined brightness value. By doing the aforementioned processing, it becomes possible to discern a boundary between the object and the non-object in the tomographic images.

Moreover, the generating may include; (a2) allocating brightness values of first voxels in a first voxel space to corresponding second voxels in a second voxel space, wherein the first voxel space contains the plural tomographic images, the second voxel space contains the target shape, and each of the first voxels is located in any one of the plurality of tomographic images; and (a3) allocating, to each voxel which is in the second voxel space and does not have a brightness value, a brightness value of a third voxel which is the closest to the voxel. By doing the aforementioned processing, the target shape becomes a proper shape because proper brightness values are allocated to voxels that do not have brightness values.

Moreover, the second vertex may be specified by a vector calculated by multiplying a unit normal vector for the first vertex by a certain value, which is calculated by dividing the number of times that the transforming has already been executed by the predetermined number. By doing the aforementioned processing, it becomes possible to transform the reference shape gradually so as not to occur an unnatural shape such as overlapping.

Moreover, the setting may include; (b1) moving a vertex to be processed to a point of destination that is located on a normal line of the vertex to be processed, wherein a distance between the vertex to be processed and the point of destination is a predetermined second distance; (b2) first determining whether the point of destination is included in a first voxel space that contains the plurality of tomographic images; (b3) upon determining that the point of destination is included in the first voxel space, second determining, based on an inner product of a normal vector of the vertex to be processed and a normal vector of the point of destination, whether the point of destination passes through the first shape; (b4) upon determining that the point of destination does not pass through the first shape, third determining whether a brightness value at the point of destination is the predetermined brightness value; (b5) upon determining that the brightness value at the point of destination is the predetermined brightness value, fourth determining that the vertex to be processed is the first vertex; and (b6) upon determining that the brightness value at the point of destination is not the predetermined brightness value, executing the moving and the first to third determining again for the point of destination. By doing the aforementioned processing, it becomes possible to specify the first vertex from the target shape.

Moreover, the first specifying may include: (b7) each of the plural first vertices so as to become at a second distance or more from any of the other first vertices. By doing the aforementioned processing, because portions to be transformed are uniform, a shape after the transformation becomes smooth and it becomes possible to generate a shape data with higher accuracy.

Moreover, the shape data generation method may further include: (E) outputting data of the first shape after the executing. By doing the aforementioned processing, it becomes possible for a user to determine whether the first shape after the executing is proper or not.

Moreover, the transforming may include: (c1) transforming using TPS Warp (Thin Plate Splines Warp). By using TPS Warp, it becomes possible to transform so as to match the first vertex to the second vertex.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    generating data of a target shape of transformation from a plurality of tomographic images of an object;
    first specifying, from among a plurality of vertices of a first shape that is a reference shape of the object and is to be transformed, a plurality of first vertices, each first vertex of which satisfies a condition that a normal line of the first vertex passes through the target shape at a position corresponding to a boundary of the object in any one of the plurality of tomographic images;
    second specifying, for each of the plurality of first vertices, a second vertex that internally divides a segment between the first vertex and the position;
    transforming the first shape so as to put each of the plurality of first vertices on a corresponding second vertex;
    setting a shape after the transforming to the first shape; and
    executing the first specifying, the second specifying, the transforming and the setting a predetermined number of times.

2. The non-transitory computer-readable storage medium as set forth in claim 1, wherein the generating comprises:
    setting a brightness value of the position to a predetermined brightness value.

3. The non-transitory computer-readable storage medium as set forth in claim 1, wherein the generating comprises:
    allocating brightness values of first voxels in a first voxel space to corresponding second voxels in a second voxel space, wherein the first voxel space contains the plurality of tomographic images, the second voxel space contains the target shape, and each of the first voxels is located in any one of the plurality of tomographic images; and
    allocating, to each voxel which is in the second voxel space and does not have a brightness value, a brightness value of a third voxel which is the closest to the voxel.

4. The non-transitory computer-readable storage medium as set forth in claim 1, wherein the second vertex is specified by a vector calculated by multiplying a unit normal vector for the first vertex by a certain value, which is calculated by dividing the number of times that the transforming has already been executed by the predetermined number.

5. The non-transitory computer-readable storage medium as set forth in claim 2, wherein the first specifying comprises:
   moving a vertex to be processed to a point of destination that is located on a normal line of the vertex to be processed, wherein a distance between the vertex to be processed and the point of destination is a predetermined second distance;
   first determining whether the point of destination is included in a first voxel space that contains the plurality of tomographic images;
   upon determining that the point of destination is included in the first voxel space, second determining, based on an inner product of a normal vector of the vertex to be processed and a normal vector of the point of destination, whether the point of destination passes through the first shape;
   upon determining that the point of destination does not pass through the first shape, third determining whether a brightness value at the point of destination is the predetermined brightness value;
   upon determining that the brightness value at the point of destination is the predetermined brightness value, fourth determining that the vertex to be processed is the first vertex; and
   upon determining that the brightness value at the point of destination is not the predetermined brightness value, executing the moving and the first to third determining again for the point of destination.

6. The non-transitory computer-readable storage medium as set forth in claim 1, wherein the first specifying comprises:
   specifying each of the plurality of the first vertices so as to become at a second distance or more from any of the other first vertices.

7. The non-transitory computer-readable storage medium as set forth in claim 1, further comprising:
   outputting data of the first shape after the executing.

8. The non-transitory computer-readable storage medium as set forth in claim 1, wherein the transforming comprises:
   transforming using TPS Warp (Thin Plate Splines Warp).

9. A shape data generation apparatus, comprising:
   a memory; and
   a processor coupled to the memory and configured to execute a process, the process comprising:
   generating data of a target shape of transformation from a plurality of tomographic images of an object;
   specifying, from among a plurality of vertices of a first shape that is a reference shape of the object and is to be transformed, a plurality of first vertices, each first vertex of which satisfies a condition that a normal line of the first vertex passes through the target shape at a position corresponding to a boundary of the object in any one of the plurality of tomographic images;
   identifying, for each of the plurality of first vertices, a second vertex that internally divides a segment between the first vertex and the position;
   transforming the first shape so as to put each of the plurality of first vertices on a corresponding second vertex;
   setting a shape after the transforming to the first shape; and
   executing the specifying, the identifying, the transforming and the setting a predetermined number of times.

10. A shape data generation method, comprising:
generating, by using a computer, data of a target shape of transformation from a plurality of tomographic images of an object;
first specifying, by using the computer and from among a plurality of vertices of a first shape that is a reference shape of the object and is to be transformed, a plurality of first vertices, each first vertex of which satisfies a condition that a normal line of the first vertex passes through the target shape at a position corresponding to a boundary of the object in any one of the plurality of tomographic images;
second specifying, by using the computer and for each of the plurality of first vertices, a second vertex that internally divides a segment between the first vertex and the position;
transforming, by using the computer, the first shape so as to put each of the plurality of first vertices on a corresponding second vertex;
setting, by using the computer, a shape after the transforming to the first shape; and
executing, by using the computer, the first specifying, the second specifying, the transforming and the setting a predetermined number of times.

* * * * *